US011790933B2

(12) United States Patent
Kocks et al.

(10) Patent No.: US 11,790,933 B2
(45) Date of Patent: Oct. 17, 2023

(54) SYSTEMS AND METHODS FOR MANIPULATING ELECTRONIC CONTENT BASED ON SPEECH RECOGNITION

(71) Applicant: Verizon Patent and Licensing Inc., Basking Ridge, NJ (US)

(72) Inventors: Peter F. Kocks, San Francisco, CA (US); Guoning Hu, Fremont, CA (US); Ping-Hao Wu, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 248 days.

(21) Appl. No.: 16/836,500

(22) Filed: Mar. 31, 2020

(65) Prior Publication Data

US 2020/0251128 A1    Aug. 6, 2020

Related U.S. Application Data

(63) Continuation of application No. 16/014,178, filed on Jun. 21, 2018, now Pat. No. 10,657,985, which is a
(Continued)

(51) Int. Cl.
*G10L 25/00* (2013.01)
*G10L 25/57* (2013.01)
(Continued)

(52) U.S. Cl.
CPC ............ *G10L 25/57* (2013.01); *G06F 16/784* (2019.01); *G06F 16/7834* (2019.01);
(Continued)

(58) Field of Classification Search
CPC ....... G10L 15/26; G10L 17/005; G10L 17/00; G10L 15/08; G10L 25/57; G10L 15/06;
(Continued)

(56) References Cited

U.S. PATENT DOCUMENTS 6,131,552 A    10/2000  Paielli et al.
6,317,834 B1   11/2001  Gennaro et al.
(Continued)

FOREIGN PATENT DOCUMENTS

EP    1043665 A2   10/2000
EP    2395502 A1   12/2011
(Continued)

OTHER PUBLICATIONS

Beigi, Homayoon SM, et al. "IBM model-based and frame-by-frame speaker recognition." Speaker Recognition and its Commercial and Forensic Applications, Avignon, France 4 (1998).
(Continued)

*Primary Examiner* — Douglas Godbold
*Assistant Examiner* — Parker Mayfield

(57) ABSTRACT

Systems and methods are disclosed for displaying electronic multimedia content to a user. One computer-implemented method for manipulating electronic multimedia content includes generating, using a processor, a speech model and at least one speaker model of an individual speaker. The method further includes receiving electronic media content over a network; extracting an audio track from the electronic media content; and detecting speech segments within the electronic media content based on the speech model. The method further includes detecting a speaker segment within the electronic media content and calculating a probability of the detected speaker segment involving the individual speaker based on the at least one speaker model.

20 Claims, 23 Drawing Sheets

Related U.S. Application Data continuation of application No. 15/057,414, filed on Mar. 1, 2016, now Pat. No. 10,032,465, which is a continuation of application No. 13/156,780, filed on Jun. 9, 2011, now Pat. No. 9,311,395.

(60) Provisional application No. 61/353,518, filed on Jun. 10, 2010.

(51) Int. Cl.

| | | |
|---|---|---|
| *G10L 15/06* | (2013.01) | |
| *G06F 16/783* | (2019.01) | |
| *G10L 17/00* | (2013.01) | |
| *G10L 15/08* | (2006.01) | |
| *H04N 21/439* | (2011.01) | |
| *G06F 16/432* | (2019.01) | |
| *H04N 21/466* | (2011.01) | |

(52) U.S. Cl.
CPC .............. *G10L 15/06* (2013.01); *G10L 15/08* (2013.01); *G10L 17/00* (2013.01); *H04N 21/4394* (2013.01); *G06F 16/433* (2019.01); *H04N 21/4668* (2013.01)

(58) Field of Classification Search
CPC .. G06F 16/7834; G06F 16/784; G06F 16/433; H04N 21/4394; H04N 21/4668
See application file for complete search history.

(56) References Cited

U.S. PATENT DOCUMENTS

| | | | |
|---|---|---|---|
| 6,345,252 B1* | 2/2002 | Beigi | G06F 16/685 |
| | | | 704/E15.045 |
| 6,404,925 B1 | 6/2002 | Foote et al. | |
| 6,424,946 B1 | 7/2002 | Tritschler et al. | |
| 6,434,520 B1* | 8/2002 | Kanevsky | G10L 15/26 |
| | | | 704/E15.045 |
| 6,567,775 B1 | 5/2003 | Maali et al. | |
| 6,580,814 B1 | 6/2003 | Ittycheriah et al. | |
| 6,658,423 B1 | 12/2003 | Pugh et al. | |
| 6,728,673 B2 | 4/2004 | Furuyama et al. | |
| 6,957,337 B1 | 10/2005 | Chainer et al. | |
| 6,961,954 B1* | 11/2005 | Maybury | G11B 27/28 |
| | | | 725/53 |
| 7,184,955 B2 | 2/2007 | Obrador et al. | |
| 7,184,959 B2 | 2/2007 | Gibbon et al. | |
| 7,269,560 B2 | 9/2007 | Hershey et al. | |
| 7,328,153 B2 | 2/2008 | Wells et al. | |
| 7,343,289 B2 | 3/2008 | Cutler et al. | |
| 7,571,093 B1* | 8/2009 | Cusmariu | G10L 25/48 |
| | | | 704/239 |
| 7,689,413 B2 | 3/2010 | Hershey et al. | |
| 7,769,827 B2 | 8/2010 | Girouard et al. | |
| 7,930,306 B2 | 4/2011 | Scholtes et al. | |
| 8,392,183 B2 | 3/2013 | Weber | |
| 8,527,268 B2 | 9/2013 | Quan | |
| 8,601,076 B2 | 12/2013 | Kocks et al. | |
| 2003/0107592 A1* | 6/2003 | Li | G06F 16/784 |
| | | | 715/745 |
| 2003/0182118 A1 | 9/2003 | Obrador et al. | |
| 2003/0187820 A1* | 10/2003 | Kohut | G10L 17/00 |
| 2003/0236663 A1* | 12/2003 | Dimitrova | G10L 17/00 |
| | | | 704/E15.005 |
| 2004/0128308 A1 | 7/2004 | Obrador | |
| 2004/0143434 A1 | 7/2004 | Divakaran et al. | |
| 2005/0228673 A1 | 10/2005 | Nefian et al. | |
| 2005/0234992 A1 | 10/2005 | Haberman | |
| 2008/0028047 A1 | 1/2008 | Girouard et al. | |
| 2008/0043144 A1 | 2/2008 | Amir et al. | |
| 2008/0209229 A1 | 8/2008 | Ramakrishnan et al. | |
| 2008/0247650 A1 | 10/2008 | Amir et al. | |
| 2008/0255840 A1 | 10/2008 | Cutler | |
| 2008/0270138 A1 | 10/2008 | Knight et al. | |
| 2008/0270344 A1 | 10/2008 | Yurick et al. | |
| 2011/0035221 A1* | 2/2011 | Zhang | G10L 17/00 |
| | | | 704/E15.001 |
| 2011/0116690 A1 | 5/2011 | Ross et al. | |
| 2014/0074857 A1 | 3/2014 | Liu et al. | |

FOREIGN PATENT DOCUMENTS

| | | |
|---|---|---|
| EP | 2400404 A1 | 12/2011 |
| WO | 03041410 A1 | 5/2003 |
| WO | 03046761 A2 | 6/2003 |

OTHER PUBLICATIONS

European Search Report, dated Nov. 24, 2011, issued for EP 11004780.0-2201, 9 pgs.
European Search Report, dated Sep. 23, 2011, in Application No. 11004781.8-1224, 7 pages.
Frédéric Bimbot et al.: "A Tutorial on Text-Independent Speaker Verification", EURASIP Journal on Advances in Signal Processing, vol. 2004, No. 4, Jan. 1, 2004 (Jan. 1, 2004), pp. 430-451.
Office Action, dated Mar. 26, 2014, in U.S. Appl. No. 13/156,747.
Patel, Nilesh V. et al., "Video Classification Using Speaker Identification", Storage and Retrieval for Image and Video Databases 5, vol. 3022, Feb. 13, 1997, pp. 218-225.
Ramirez, Javier, "Statistical Voice Activity Detection Using a Multiple Observation Likelihood Ratio Test", IEEE Signal Processing Letters, vol. 12, No. 10, Oct. 2005, pp. 689-692.
Sargin, Mehmet Emre et al., "Audiovisual Celebrity Recognition in Unconstrained Web Videos", ICASSP 2009, pp. 1977-1980.
Tan, Hung-Khoon, et al. "Scalable detection of partial near-duplicate videos by visual-temporal consistency." Proceedings of the 17th SCM international conference on Multimedia. ACM, 2009.

* cited by examiner

SYSTEMS AND METHODS FOR MANIPULATING ELECTRONIC CONTENT BASED ON SPEECH RECOGNITION

CROSS-REFERENCE TO RELATED APPLICATION(S)

This patent application is a continuation of and claims the benefit of priority to U.S. application Ser. No. 16/014,178, filed on Jun. 21, 2018, which is a continuation of and claims the benefit of priority to U.S. application Ser. No. 15/057,414, filed Mar. 1, 2016, now U.S. Pat. No. 10,032,465, which is a continuation of and claims the benefit of priority to U.S. application Ser. No. 13/156,780, filed Jun. 9, 2011, now U.S. Pat. No. 9,311,395, which claims priority to U.S. Provisional Application No. 61/353,518, filed Jun. 10, 2010, the entireties of which are incorporated herein by reference.

BACKGROUND

Technical Field

The present disclosure relates to the manipulation of electronic media content, including electronic media content available over the internet. More particularly and without limitation, the present disclosure relates to systems and methods for the identification, ranking, and display of available or recommended electronic media content on the Internet, based on speech recognition.

Background Information

On the Internet, people usually discover and view multimedia and other electronic media content in one or more fundamentally different ways: keyword searching, browsing collections, selecting related content, and/or link sharing. One common way to browse a video collection is to display a list of images that the user can browse and click to watch the videos. A user interface may be provided to allow the user to narrow the displayed list by one or more criteria, such as by category, television show, tag, date produced, source, or popularity. User interfaces may also provide the ability for users to search for videos, or other electronic media.

The performance of video search engines can be evaluated by examining the fraction of videos retrieved that are relevant to a user query and the fraction of retrieved videos that are relevant to the user's need. The traditional way for enabling searching for video content is based on metadata for a video, such as title, description, tags, etc. There are two drawbacks with this approach. First, the metadata is usually quite limited and it only provides a very brief summary of a video. In addition, the metadata of a video may not be reliable or complete, especially for those videos from a user-generated video site, such as YouTube. For example, many videos from YouTube are in fact spam videos having metadata that has nothing to do with the content of the video.

Speech-to-text techniques may be used to augment the metadata of a video and to improve recall from a collection of videos. Also, a popularity and/or collaborative filter may be used to improve precision, in addition, visual analysis to identify people or objects contained within a video can be used in some cases for both improved recall and precision. However, these techniques also have drawbacks. For example, analyzing the visual content of a video to identify people and objects is computationally resource intensive and often inaccurate. Also, using only visual analysis to identify people in a video can lead to unreliable or incomplete results because the video may contain still or moving images of a person with a voice over by a narrator.

As a result, users of the Internet are often unable to find desired media content, and they often view content that they do not necessarily appreciate. Undesirable content can lead to users traveling away from the content sites, which may result in an attendant decrease in advertising revenue. As a corollary, the successful display and recommendation of electronic media content can be useful in attracting and retaining Internet users, thereby increasing online advertising revenue.

As a result, there is a need for improved systems and methods for manipulating electronic media content, including available or recommended electronic media content on the Internet. Moreover there is a need for improved systems and methods for the identification, ranking, and/or manipulating of available or recommended electronic media content on the Internet, based on speaker recognition.

SUMMARY

In accordance with one exemplary embodiment, a computer-implemented method is disclosed for manipulating electronic multimedia content. The method includes generating, using a processor, a speech model and at least one speaker model of an individual speaker. The method further includes receiving electronic media content over a network; extracting an audio track from the electronic media content; and detecting speech segments within the electronic media content based on the speech model. The method further includes detecting a speaker segment within the electronic media content and calculating a probability of the detected speaker segment involving the individual speaker based on the at least one speaker model.

In accordance with another exemplary embodiment, a system is disclosed for manipulating electronic multimedia content. The system includes a data storage device storing instructions for manipulating electronic multimedia content and a processor configured to execute the instructions stored in the data storage device for generating a speech model and at least one speaker model of an individual speaker; receiving electronic media content over a network; extracting an audio track from the electronic media content; detecting speech segments within the electronic media content based on the speech model; and detecting a speaker segment within the electronic media content and calculating a probability of the detected speaker segment involving the individual speaker based on the at least one speaker model.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF DRAWINGS

FIG. 17A is a screenshot of an exemplary search result of a speaker and corresponding video clips of a system for manipulating electronic media content over the Internet, consistent with embodiments of the present disclosure;

FIG. 17B is a screenshot of an exemplary search result of a speaker, corresponding video clips, and detailed information about the speaker of a system for manipulating electronic media content over the Internet, consistent with embodiments of the present disclosure;

FIG. 18 is a screenshot of exemplary video search results of a speaker with a filtering element of a system for manipulating electronic media content over the Internet, consistent with embodiments of the present disclosure.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or dedicated to a particular geographic region.

Additional objects and advantages will be set forth in part in the description which follows, and in part will be obvious from the description, or may be learned by practice of the embodiments of the invention. For example, the objects and advantages may be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION

Exemplary embodiments of the present disclosure generally relate to the manipulation of electronic media content, including electronic media content available over the Internet. More specifically, embodiments of the present disclosure relate to speaker recognition techniques for identifying a person's voice within a video stream, and using such speaker recognition techniques to improve the rank-ordering of results of a search algorithm used to find appropriate videos within a collection of videos. In addition, the disclosed embodiments use speaker recognition to filter a collection of videos, for example, to include only videos containing a given individual's voice, to eliminate duplicate videos by identifying speech common to a collection of videos, and to increase the efficiency of further content analysis, including speech recognition and visual content analysis, such as to identify people by pre-selecting videos that match the person's voice, etc. Furthermore, although described herein primarily in relation to video content, the disclosed embodiments may be applicable to essentially any type of electronic media content, including web sites, audio clips, streaming media, full-length television episodes, movies, live broadcasts, songs, presentations, etc.

Figure 1:
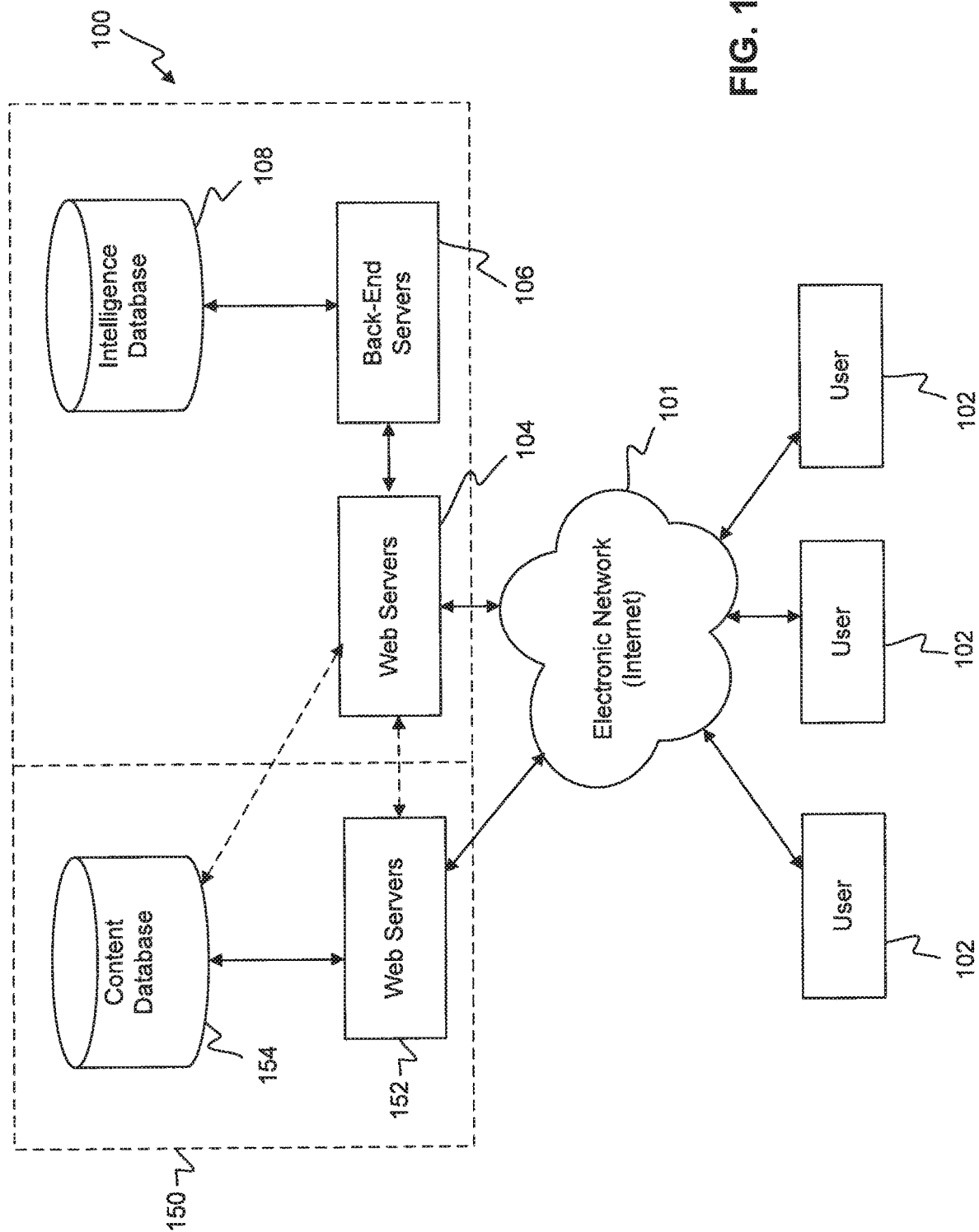
FIG. 1 depicts an exemplary system for manipulating electronic media content over the Internet, consistent with embodiments of the present disclosure.

FIG. 1 depicts an exemplary embodiment of a system 100 for manipulating electronic media content based on speaker recognition, within which embodiments of the present disclosure may be practiced. As shown in FIG. 1, a plurality of users 102 may be connected to an electronic network 101 and configured to communicate with one or more web servers of system 100. Users 102 may be people who are using any type or combination of personal computers, laptops, components of a computer, set top boxes, $3^{rd}$ party portals, DVD players, digital video recorder (DVR) platforms, mobile phones or devices, PDAs, etc., or any other device configured to display multimedia content. Although the embodiment of FIG. 1 depicts limited numbers of clients and servers, it will be appreciated that exemplary system 100 may include any number of clients and servers without departing from the spirit or scope of the present disclosure.

Electronic network 101 may represent any combination of networks for providing digital data communication. Electronic network 101 may include, for example, a local area network ("LAN"), an intranet, and/or a wide area network ("WAN"), e.g., the Internet. In the embodiments described herein, electronic network 101 may include any publicly-accessible network or networks and support numerous communication protocols, including, but not limited to, hypertext transfer protocol (HTTP) and transmission control protocol (TCP/IP).

In general, system 100 may include web servers 104, back-end servers 106, and an intelligence database 108. System 100 may also include or be disposed in communication with one or more content providers 150. Each content provider 150 may be operated by a third party and/or by the operator of system 100. Content provider 150 may include one or more web servers 152 and a content database 154. Electronic network 101 may be connected to one or more of web servers 104, 152 such that clients 102 may be disposed in communication with the servers. It will be appreciated that each of web servers 104, 152, and back-end servers 106 may include any number or combination of computers, servers, or clustered computing machines. Moreover, databases 108, 154 may each include any number or combination of databases, which may be arranged in a "distributed computing" environment, including large-scale storage (LSS) components and/or distributed caching (DC) components. The servers and databases may be independent devices or may be incorporated into a single unit of hardware, e.g., a single computer system or single server system. In one embodiment, web servers may include a software application, such as a web service executing on a computer.

In one embodiment, intelligence database 108 may be configured to store a large volume (millions or more) of pieces of data regarding video information, speech information, speaker/speech models, user preferences, user web history, content click data, user browser information, etc. For example, intelligence database 108 may be configured to store and index videos, speech models, speaker models, speakers associated with the videos, times during which speakers are speaking on those videos, etc. Meanwhile, content database 154 may be configured to store a large volume of different content items, such as videos, audio tracks, etc. Content database 154 may be operated by one or more third-party content providers 150, or by the operator of web servers 104 and back-end servers 106. In one embodiment, the operator of web servers 104 and back-end servers 106 may be configured to interact with numerous content providers 150 for obtaining video content. The operator of web servers 104 and back-end servers 106 may also maintain their own database of content items. Thus, any combination or configuration of web servers 104, back-end servers 106, intelligence database 108, web servers 152, and content database 154 may be configured to perform the exemplary methods of FIGS. 2-8; and to generate and display the interfaces exemplified by the screenshots of FIGS. 9-19, as will be described in more detail below.

Figure 2:
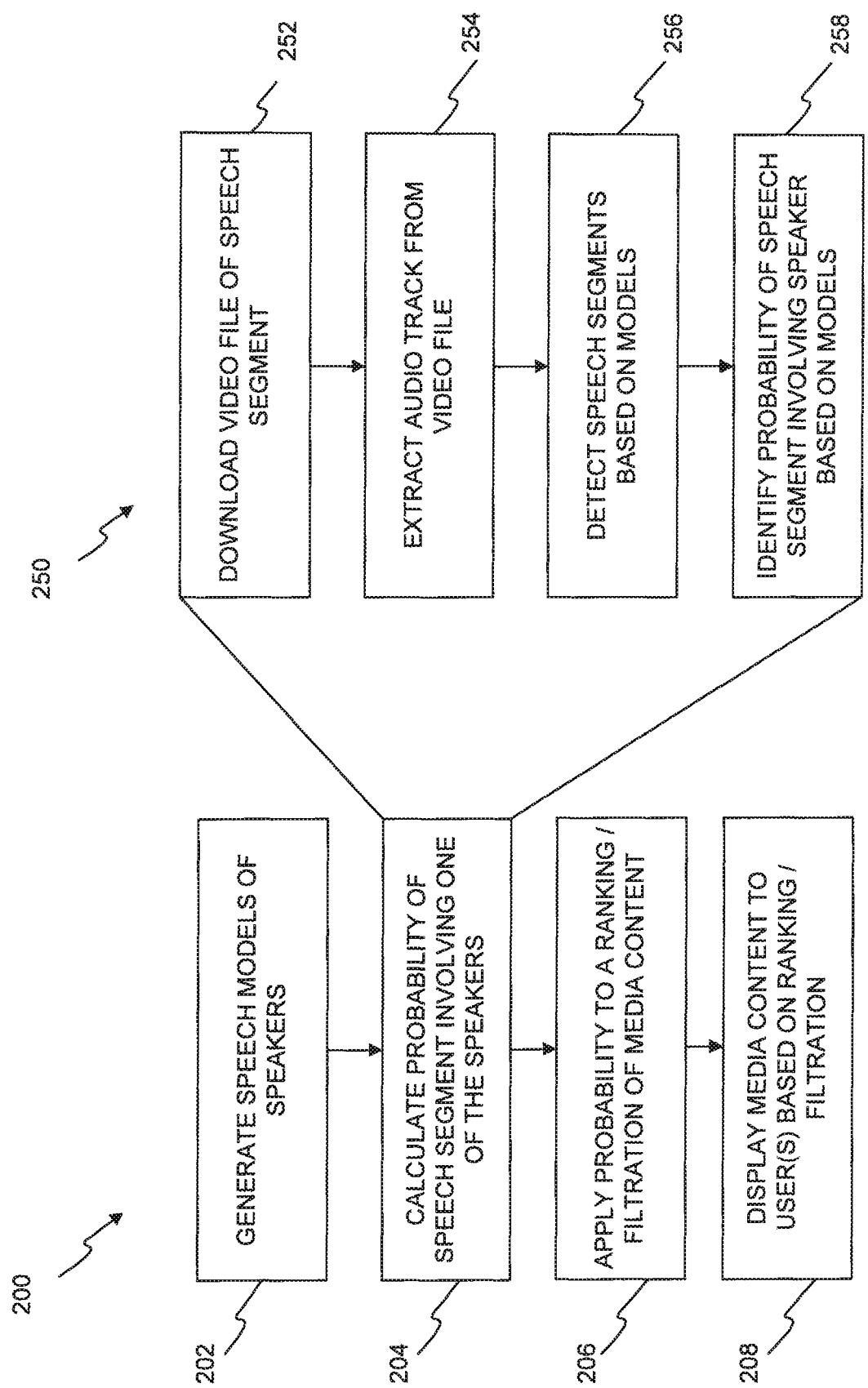
FIG. 2 depicts an exemplary method for manipulating electronic media content over the Internet, consistent with embodiments of the present disclosure.

FIG. 2 depicts an exemplary method 200 for manipulating electronic media content, consistent with embodiments of the present disclosure. In general, method 200 may include generating speech models of speakers (step 202). For example, method 200 may include generating a so-called "fingerprint" of the voice or speech of any speaker, with each speaker being associated with a unique speech model. In certain embodiments, speakers of particular interest to users 102, and therefore the operator of system 100 include celebrities, politicians, athletes, and other "famous" people. Nevertheless, the systems and methods described herein are applicable to the recognition of any individual's voice and/or speech. In one embodiment, processors associated with back-end servers 106, or any other processor(s) may generate speech models of speakers. Method 200 may further include calculating a probability of a speech segment involving one of the speakers (step 204). Method 200 may further include applying the calculated probability to a ranking and/or filtration of electronic media content (step 206). For example, method 200 may include sorting videos by how many minutes a selected speaker is speaking in the videos and/or when a selected speaker first started talking. Similarly, method 200 may include filtering out videos in which the selected speaker is speaking in the videos. In one embodiment, processors associated with back-end servers 106, or any other processor(s), may perform the probability and/or filtration calculations of step 206. Method 200 may also include displaying or otherwise presenting electronic media content to users based on the ranking and/or filtration (step 208). Thus, method 200 may facilitate the playback or presentation of electronic media content to users of the Internet, based on the recognition of certain speakers' quantity or characteristic of speech within videos available on the Internet.

In FIG. 2, an exemplary process for calculating a probability of a speech segment involving one of the speakers is provided in detail with respect to exemplary method 250. Method 250 may include downloading a video file (step 252). For example, a video may be downloaded from a content provider 150 on the Internet to a specific location (a disk, database or other filer), using any suitable type of protocol, such as http, mms, rtsp, rtmp, rm, etc. Method 250 may also include extracting an audio track from the video file (step 254), using any suitable techniques. For example, the sound track of a video may be extracted, optionally re-sampled to 22050 Hz, and normalized to 70 dB, if desired. Method 250 may further include identifying a probability of a speech segment involving a speaker (step 256), based on speech models (such as those generated in step 202), to divide the audio track into segments where people are speaking. Method 250 may further include detecting and segmenting speech from a particular speaker, based on an associated "speaker model" generated in step 202 (step 258). Methods 200 and/or 250 may be performed by any combination of web server systems 104 and back-end server systems 106.

Figure 3:
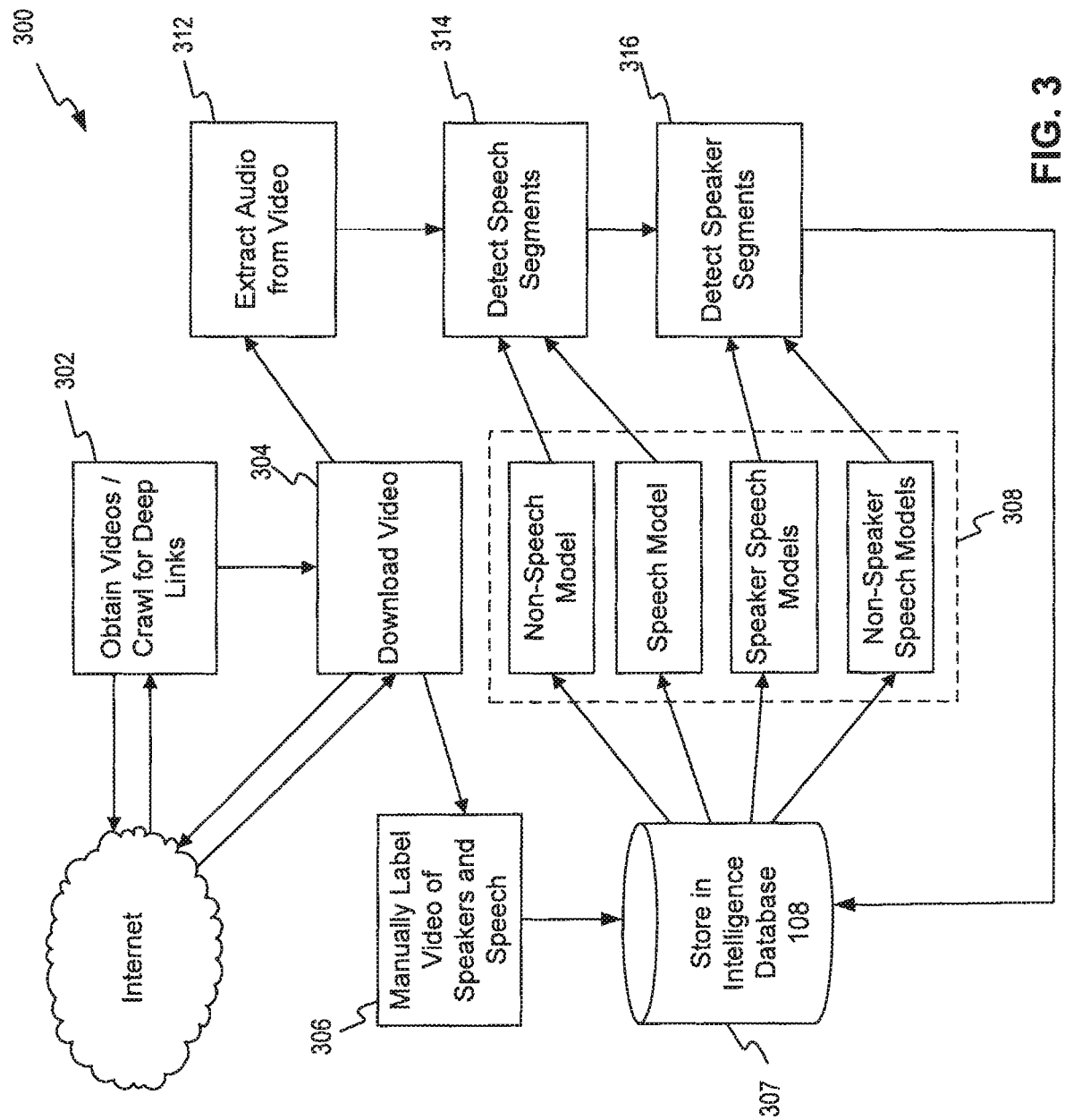
FIG. 3 depicts a flowchart of an exemplary process flow for manipulating electronic media content over the Internet, consistent with embodiments of the present disclosure.

FIG. 3 depicts a more detailed flow diagram of an exemplary method 300 for manipulating electronic media content over the Internet, based on speaker recognition. Method 300 may include obtaining videos over the Internet (step 302), for example, by crawling the Internet for deep links that point to actual video streams. Method 300 may further include downloading videos from the Internet (step 304). For example, as described above, method 300 may use any suitable method or protocol to store video files in a local database. Method 300 may further include manually labeling or tagging videos based on speakers and/or speech identified in the videos by humans (step 306). For example, method 300 may employ editors or other individuals to watch and/or listen to videos to determine the individuals that are speaking on the video, and assign tags accordingly, e.g., by storing tagged videos in intelligence database 108 (step 307).

Method 300 may further include building and training speech/speaker models (step 308), based on the stored labels or tags of the manually-identified speakers. In one embodiment, at least four different models may be built, including a non-speech model and speech model, which are used to detect speech segments; as well as a speaker speech model and a non-speaker speech (i.e., a background speech) model, which are used for detecting speaker segments (i.e., for particular speakers). In one embodiment, a background speech model represents the common characteristics from a variety of different speakers.

Thus, given a video file having its audio track extracted (step 312), method 300 may also include detecting speech segments (step 314), based on the non-speech and speech models. Method 300 may then further include detecting speaker segments to determine which speakers are speaking (step 316), based on the speaker speech models and non-speaker speech models, as will be described in more detail below. The information gained from detecting speaker segments (step 316) may be stored in intelligence database 108 (step 307), and then used for applying a speaker probability to a ranking/filtration of media content (step 206 of method 200), and displaying media content to users based on the ranking/filtration (step 208 of method 200).

The step of detecting speech segments based on speech and non-speech models (step 314) may be performed based on any suitable methods. In one embodiment, the entire audio stream may be divided into 25-ms frames, with 15-ms overlap between consecutive frames. The likelihood, l(x), that the sound within a given frame is speech is calculated using:

$$l(x) = \frac{p(x|H_0)}{p(x|H_1)},$$

where $H_0$ is the hypothesis that a sound is speech; $H_1$ the hypothesis that it is not speech; and x represents the audio features extracted from the sound in this frame. Features examined may include mel-frequency cepstrum coefficients (MFCC), energy, zero-crossing rate, and others. These features may be compared to training data obtained from audio segments that are known to contain, or not contain, speech. A Gaussian Mixture Model (GMM) may be used for pattern matching the x features against the training data and arriving at a probability of similarity, $p(x_i|H_0)$ may be the likelihood of a sound to be speech and $p(x_i|H_1)$ may be the likelihood of a sound to be non-speech. It will be appreciated by those of skill in the art that: $0 < p(x_i|H_0) < \infty$ and $0 < p(x_i|H_1) < \infty$.

In general, the sound within a single frame by itself might not be reliably used to determine whether the frame contains speech. To improve the accuracy, a window may be created around the frame being examined by selecting n frames from before and after the frame. The weighted sum of individual likelihood ratios may be:

$$\bar{l} = \sum_{i=1}^{n} W_i \log(l(x_i)) + C$$

where $W_i$ and constant C are chosen using a linear discriminant analysis, such that the weighted sum may be optimized to distinguish speech from non-speech. In particular, the weighted sum may be distributed around 0, where positive values indicate speech and negative values indicate non-speech, where $-\infty < \bar{l} < \infty$.

In one embodiment, a frame may be labeled as speech if the corresponding weighted sum is higher than a threshold (usually 0); otherwise, the frame may be labeled as non-speech. Merging consecutive frames with the same labels into larger segments may be performed to determine the boundaries of speech. In addition, very short segments whose durations are below 50 ms may be further merged with neighboring segments to reduce error.

The step of detecting speaker segments (i.e., determining whether one of the modeled speakers is speaking) may follow a procedure similar to that of audio scene analysis, as described above. However, the likelihood measure may be obtained with a pre-trained speaker model and background speech model. Moreover, when calculating the weighted sum of likelihood ratios, the weights may be adjusted further according to whether or not those frames are detected as speech, as described above. In one embodiment, segments may be generated only based on detected speech portions. Finally, instead of using a threshold of 0, a threshold that yields a higher precision rate (e.g. 90%) may be used.

As described above, four different models may be pre-trained before running detection, including speech and non-speech models for speech detection, and speaker/background speech models for speaker detection. It will be appreciated by those of skill in the art that the speech model for speech detection and that for speaker detection may be distinct from each other, since different sets of features may be used, and a different background speech model may be adapted for each speaker. In one embodiment, Gaussian mixture models may be used, and the best feature set and number of mixtures may be determined by using cross-validation.

In one embodiment, system 100 and methods 200, 300 may generally display or playback electronic media content analyzed based on speaker recognition, to users via the Internet. For example, electronic media content may be distributed to users over their mobile devices, computers, televisions, or any other Internet-enabled devices. Users may search for and view analyzed electronic media content using web browsers, mobile applications, television programming guides, or any other software configured to interact with web servers 104, back-end servers 106, and/or web servers 152.

Figure 4A:
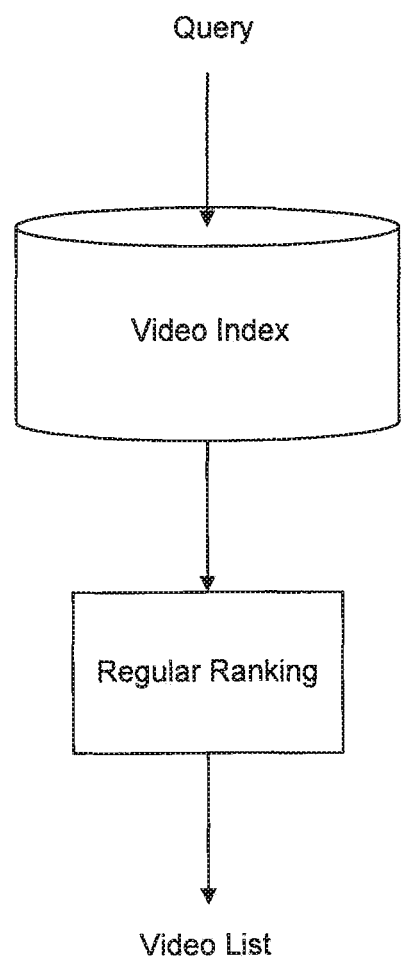
FIG. 4A depicts a flow diagram of a typical video search engine for manipulating electronic media content over the Internet, consistent with embodiments of the present disclosure.

FIG. 4A depicts a flow diagram of a typical video search engine. Such a search engine may return a list of top-ranked videos in response to a search query. In particular, when receiving a query, this engine may search a video index and generate a list of video associated with the query. The search engine may then send the list to a video ranking system, which in principle could be any existing video ranking system. This ranking system, referred to as $R_R$, may calculate a rank value for every video in the list. The engine may then sort all the videos based on their rank values and then return the videos on the top of the sorted list. An example of such a ranking system is described in U.S. Pat. No. 7,370,381, filed by Nov. 22, 2005, by Timothy D. Tuttle et al., which is commonly owned by the assignee of this application.

Figure 4B:
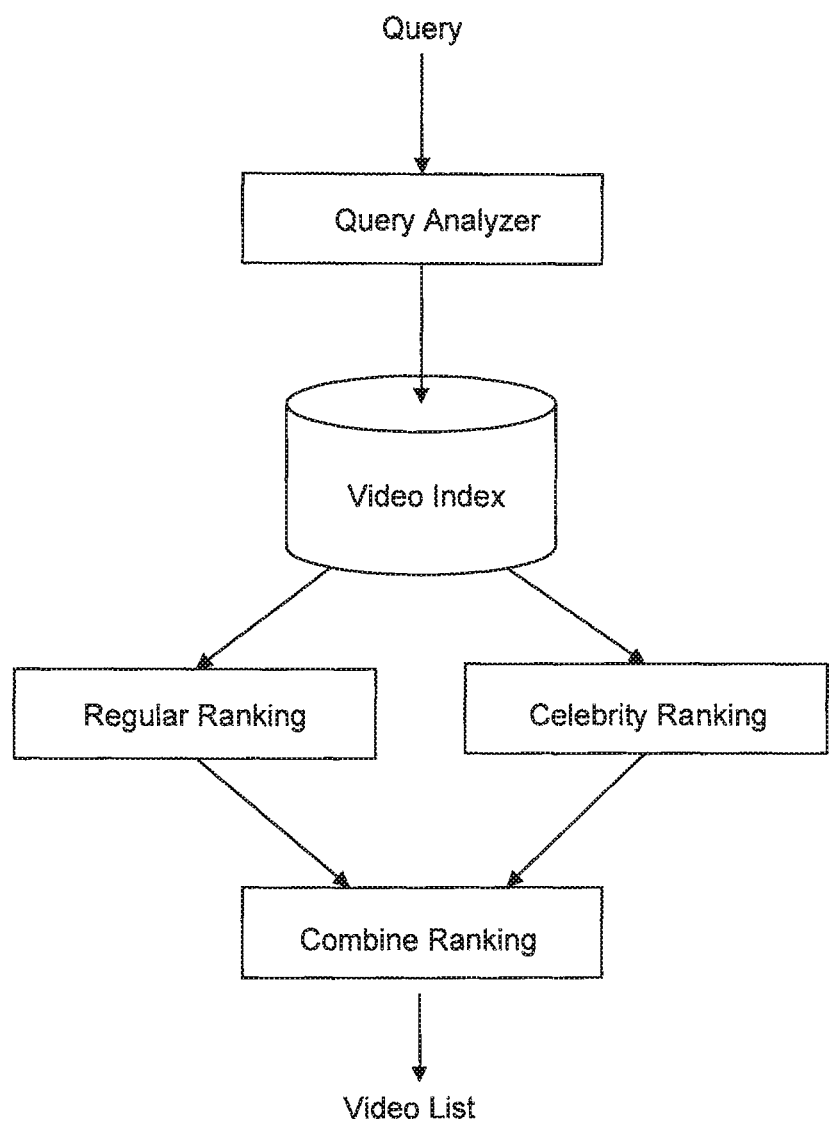
FIG. 4B depicts a flow diagram of an exemplary video search engine that utilizes speaker recognition to improve the rank-ordering of results for manipulating electronic media content over the Internet, consistent with embodiments of the present disclosure.

FIG. 4B depicts a flow diagram of an exemplary video search engine that utilizes speaker recognition to improve the rank-ordering of results at step 206 of method 200. In one embodiment, the video search engine of FIG. 4B may be built on top of the search engine shown in FIG. 4A. In contrast to that of FIG. 4A, the search engine of FIG. 4B may first analyze a query and determine a list of speakers S associated with a query. The engine may then search a video index and generate two lists of videos. The first list may include all the videos whose metadata are associated with the query in the index, the same as that generated by the system of FIG. 4A. This list may be sent to the regular ranking system $R_R$. The second list may be a subset of the first list, i.e., containing only videos with speech from the speakers in list S. This list may be sent to another ranking system that calculates rank values based on the result of speaker recognition, referred to as $R_S$. The search engine may combine rank values from both $R_R$ and $R_S$ to compute a final rank value of each video, and use this final rank value to sort the videos and return videos on the top of the sorted list.

In the search engine shown in FIG. 4B, upon receiving a query, the query analyzer may return a list of speakers. In general, the query analyzer may link a speaker with a query based on any connection between the query and the metadata associated with the speaker. Some exemplary approaches are listed below:

1. Text relevancy: The query analyzer may calculate the text relevancy between the query and a description of a speaker, such as the description from Wikipedia. A speaker may be added to the list if the relevancy value is above a threshold.

2. Categorization: The query analyzer may categorize both speakers and queries, and return the speakers in the same category as the input query. The analyzer may categorize a speaker based on his/her career, activities, and achievements, etc. For example, the query analyzer may categorize "comedy" to an actor in a comedy show. In one embodiment, one speaker may have multiple categories. On the other hand, a query may be categorized by analyzing its own text and the metadata of associated videos. For example, the analyzer may assign the category "comedy" to a query containing the word "funny."

3. Event association: The query analyzer may associate speakers with one or multiple events from a list of pre-determined events. For example, the query analyzer may associate "Barack Obama" with the event "Healthcare." Upon receiving a query, the analyzer may determine whether the query is associated with an event and then return the associated speakers accordingly.

In the system shown in FIG. 4B, the additional rank system $R_S$ calculates a rank value for each pair of a speaker and a video based on a speaker detection result of method 204. Given that $r_S(i,j,q)$ represents the rank value for speaker i and video j, where q is the original query, one way to calculate $r_S(i,j,q)$ is to assign a positive constant when speaker i spoke in video j, and 0 otherwise. An alternative embodiment of the method involves using a linear combination of features derived from speaker detection, i.e.:

$$r_s(i, j, q) = \sum_m w_m f_m(i, j, q)$$

where $f_m$ is a feature indexed by m and $w_m$ is the corresponding weight. $f_m$ may be text relevancy between the query and the metadata of speaker i, normalized duration of speech segments from speaker l, and the average probability of these speech segment, etc. In particular, $r_S(i,j,q)=0$ if speaker i did not speak in video j.

The system of FIG. 4B may merge regular rank values $r_R(j,q)$ and speaker rank values $r_S(i,j,q)$ to calculate a final rank value $r(j,q)$. An exemplary formula for calculating $r(j,q)$ may be a weighted linear combination of these rank values:

$$r(j, q) = W_0(q) r_R(j, q) + \sum_i W_i(q) r_s(i, j, q)$$

where W is the weight, which may be determined by the association between original query and individual speakers. One exemplary case may set $W_0=0$, which is in fact an implementation of filtering videos based on speaker recognition. Another exemplary case may involve setting all the weights to 1 and $r_S(i,j,q)$ to a constant positive. Consequently, the final rank of a video may be boosted by a constant value for every speaker that talks in the video.

Figure 5:
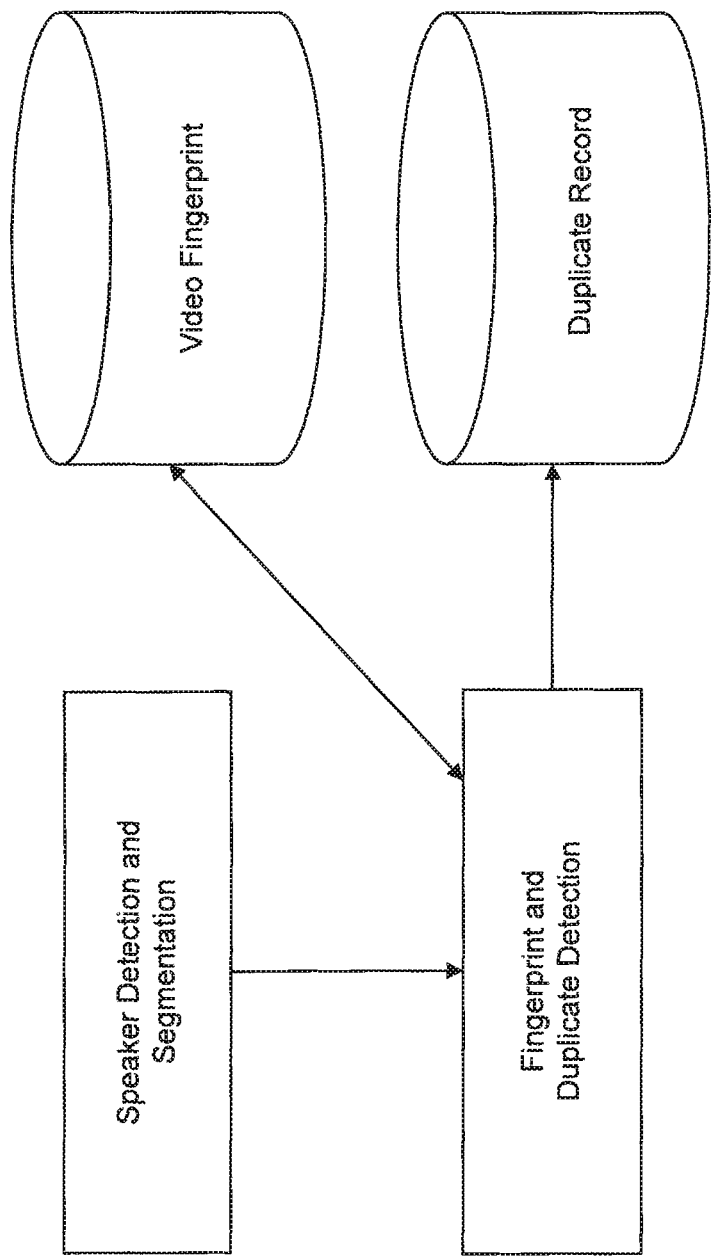
FIG. 5 depicts a flow diagram of an exemplary system of online duplicate videos detection based on speaker recognition for manipulating electronic media content over the Internet, consistent with embodiments of the present disclosure.

FIG. 5 depicts a flow diagram of an exemplary system of online duplicate videos detection. The system of FIG. 5 may utilize the result from step 204 of method 200 to detect duplicates among videos in which a known speaker spoke, in particular, once a speaker is detected in a new video, the system may fingerprint the detected video and use the fingerprint to search duplicates among stored videos. To speed up the search, the system may pre-calculate and store fingerprints of all videos and limit the search among videos in which the very speaker spoke. When duplicates are found, the system may record the search result, which may be used to eliminate duplicates by a video search engine. When no duplicate is found, the system may consider the video as a new video and store the video in the video fingerprints database. To calculate the fingerprint of a video, this system may, in principle, apply any general fingerprinting method. The system may also use the detected speaker segments and associated probabilities as the fingerprint.

Figure 6:
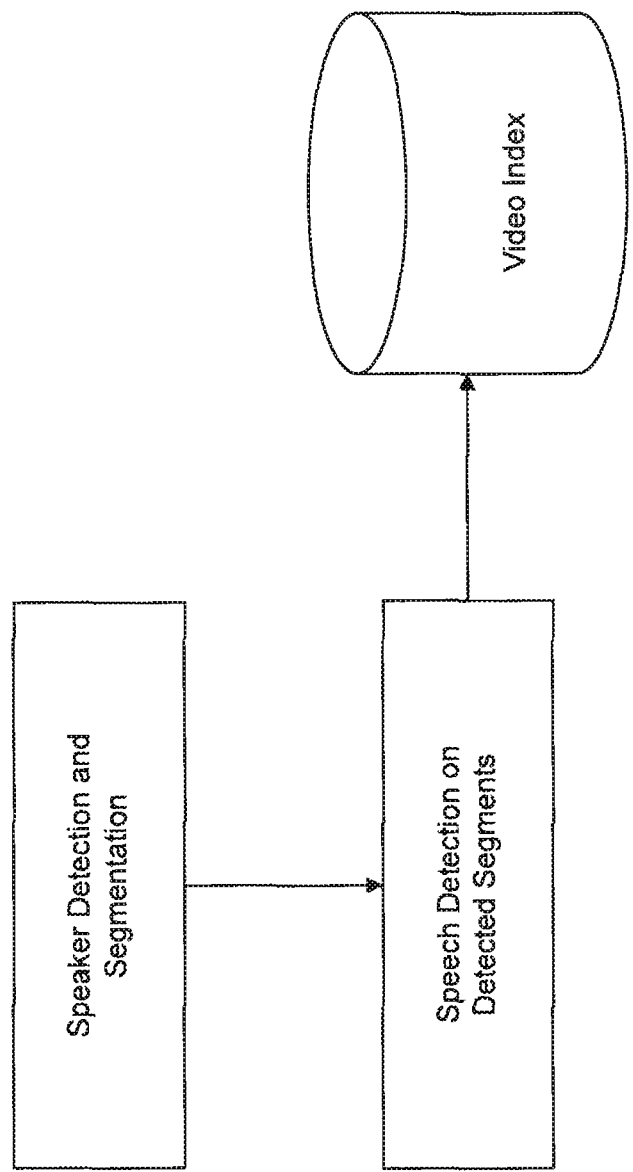
FIG. 6 depicts a flow diagram of an exemplary system of speech detection based on speaker recognition for manipulating electronic media content over the Internet, consistent with embodiments of the present disclosure.

FIG. 6 depicts a flow diagram of an exemplary system of speech detection built on top of method 200. The system of FIG. 6 may recognize speech from a particular speaker, which may allow better ranking/filtering of video search result. For example, by detecting that, e.g., "Barack Obama" spoke the word "healthcare" in the indexed videos, one could use the system as a filter to return only detected videos or increase rank values of these videos for the query "Obama, healthcare". As shown in FIG. 6, this system may perform speech detection on detected speech segments of particular speakers and then store the text of detected speech to video index. In performing speech to text translation, one could apply any speech recognition technique, for example, a hidden Markov model for general speech or hidden Markov models specially trained for individual speakers.

Figure 7:
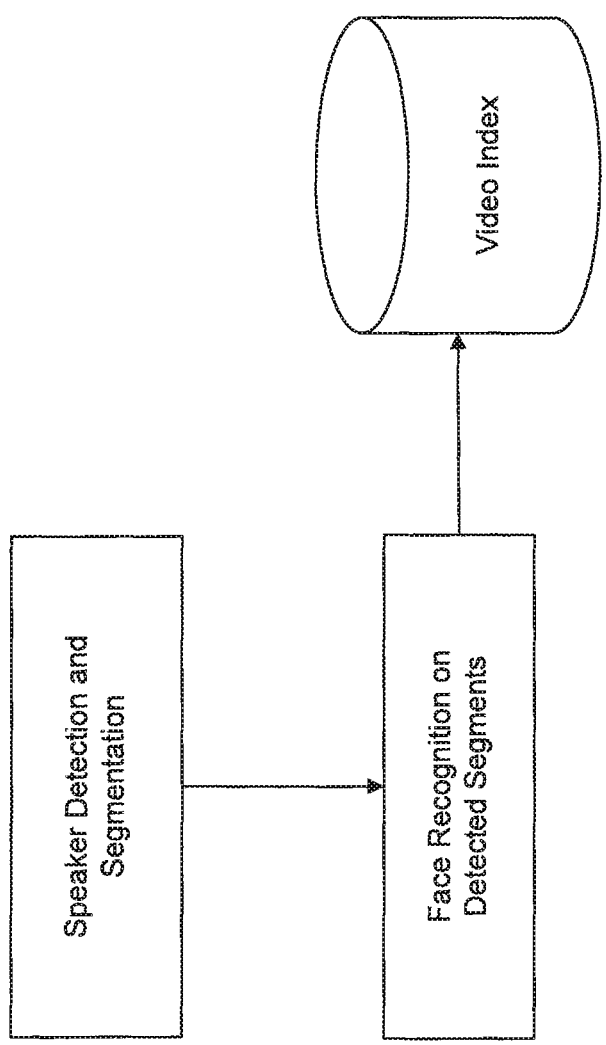
FIG. 7 depicts a flow diagram of an exemplary system of face recognition based on speaker recognition for manipulating electronic media content over the Internet, consistent with embodiments of the present disclosure.

FIG. 7 depicts a flow diagram of an exemplary system of people identification built on top of method 200. The system of FIG. 7 may recognize certain people speaking in a video in order to improve ranking/filtering of a video search result. As shown in FIG. 7, this system may perform face recognition of a speaker on the part of a video in which the speaker spoke. One advantage of performing speaker recognition first is for improving computational efficiency, since visual analysis involves more computational resources than auditory analysis. In performing face recognition, one having ordinary skill in the art will appreciate that any face recognition techniques may be used. For example, approaches based on eigenface may be used to represent a face as a linear combination of a set of basis images, A new face may be projected on to a set of eigenfaces associated with different people to determine how the new face differs from the eigenfaces.

Figure 8:
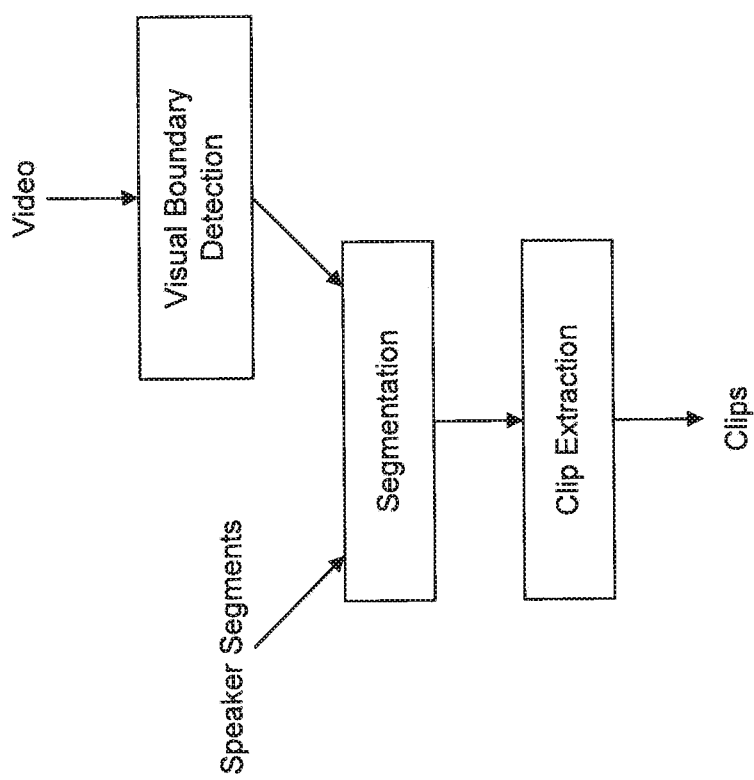
FIG. 8 depicts a flow diagram of an exemplary system of extracting preview clips based on speaker recognition for manipulating electronic media content over the Internet, consistent with embodiments of the present disclosure.

FIG. 8 depicts the flow diagram of an exemplary system of generating a display or playback clips from a video based on speaker recognition. In one embodiment, clips may contain speech from certain speakers detected at step 204 of method 200. Such clips may be used to provide previews of videos at step 208 of method 200. The system of FIG. 8 may first detect visual scene changes within the video and locate boundaries among consecutive visual scenes. One exemplary method for visual boundary detection may involve generating a histogram description of each video frame and then detecting the changes of histograms across consecutive video frames. The system may then use detected speaker segments and visual boundaries to determine appropriate starting and ending points of clips containing speech from a speaker. Finally, the system may extract clips from the video and store the clips to the video index for future preview.

Figure 9:
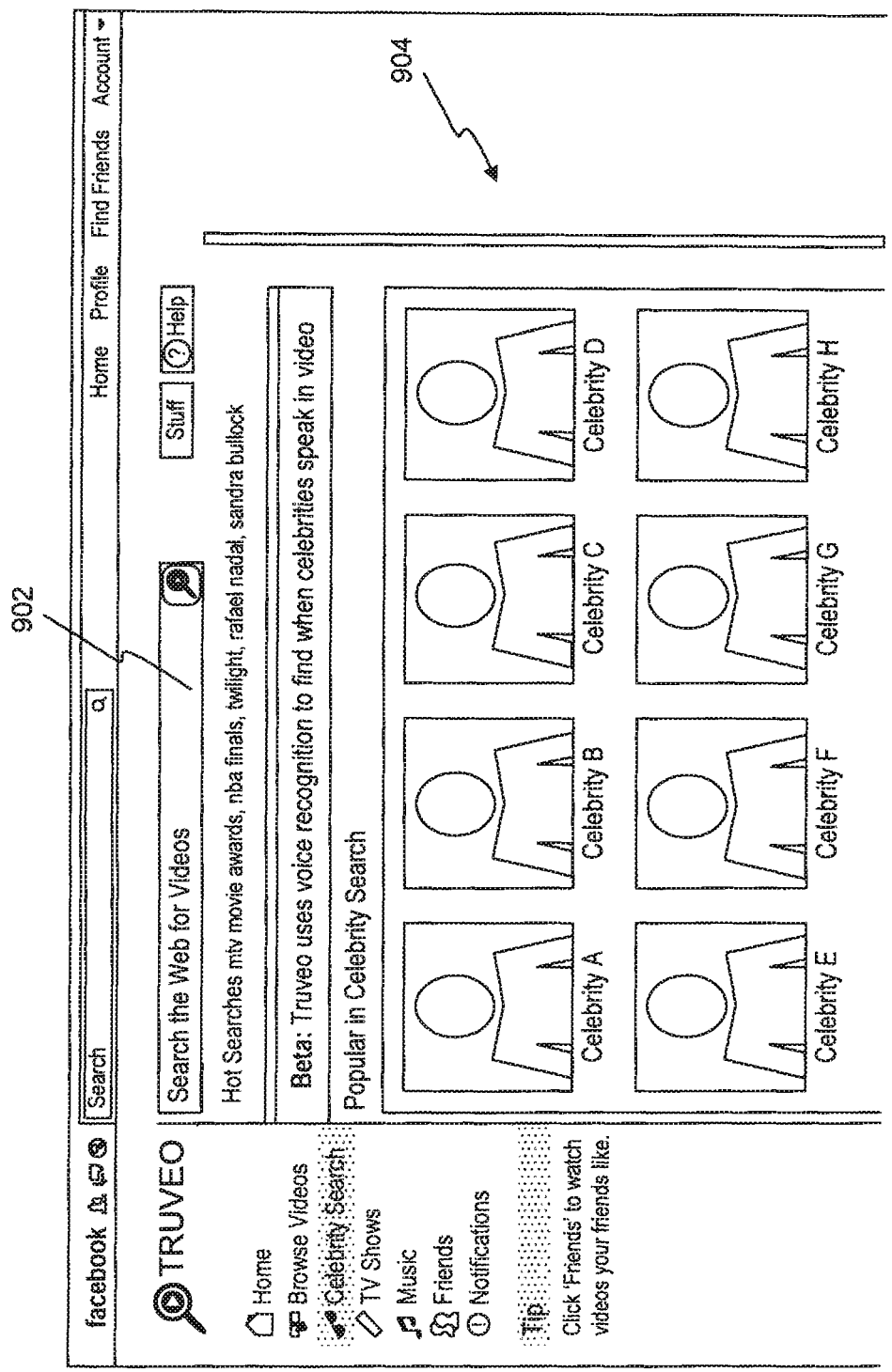
FIG. 9 is a screenshot of an exemplary search box and speaker grid of a system for manipulating electronic media content over the Internet, consistent with embodiments of the present disclosure.

FIG. 9 is a screenshot of an exemplary search box and speaker grid on a website of a system for manipulating electronic media content based on recognized speech. In particular, FIG. 9 depicts a screenshot of an exemplary video search module incorporated into a social networking web site. The video search module may include a search box 902, into which a user may type the names of celebrities or other speakers the user desires to view in a video. The video search module may also contain a celebrity/speaker grid 904, to exemplify the speakers for whom speech models have been created. Users may click on one of the celebrities/speakers in the grid 904 or search for additional individuals using search box 902. Thus, when a user selects a speaker icon or searches for a speaker, the system may search intelligence database 108 for videos identified as having speech by that speaker. Of course, intelligence database 108 may comprise tables, indices, etc. for searching by speaker, and may be combined with any desired type of access protection or back-up mechanisms. In one embodiment, the video search module and/or social networking sites may be operated on web servers 104, while speech recognition and video analysis methods may be operated on back-end servers 106.

Figure 10:
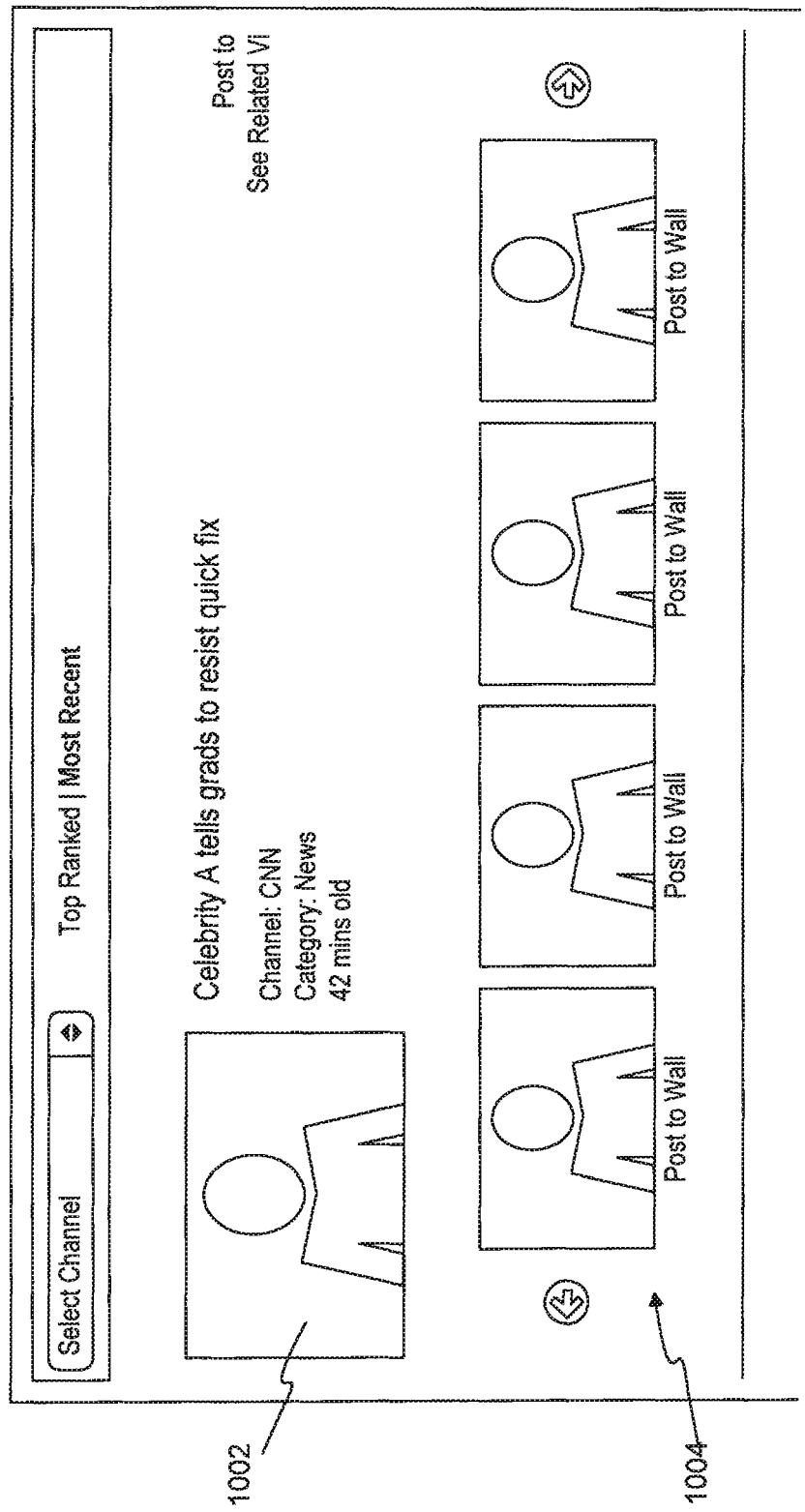
FIG. 10 is a screenshot of an exemplary search result and corresponding video clips of a system for manipulating electronic media content over the Internet, consistent with embodiments of the present disclosure.

FIG. 10 is a screenshot of an exemplary search results page and corresponding video clips associated with a video search module. In particular, assuming a user has clicked on the "Barack Obama" icon in the celebrity/speaker grid 904, the search results page may display a primary video dip 1002, as well as a plurality of shorter, component video clips 1004. For example, in one embodiment, methods 200 and 300 may be used to identify a video clip that has the longest section of speech by the speaker, in this case Barack Obama. That video clip may be displayed as the primary video clip 1002. The component video clips 1004 may be shorter 8-20 second clips that users can "mouse over" to watch short preview of parts of the primary video clip 1002. If users click on the primary video clip 1002 or component video dips 1004, they may be redirected to the web site on which the video(s) is stored (e.g., to access content database 154 via web servers 152). In one embodiment, primary video clip 1002 may be assembled from component video clips obtained from disparate sources, such as multiple content providers 150.

Figure 11:
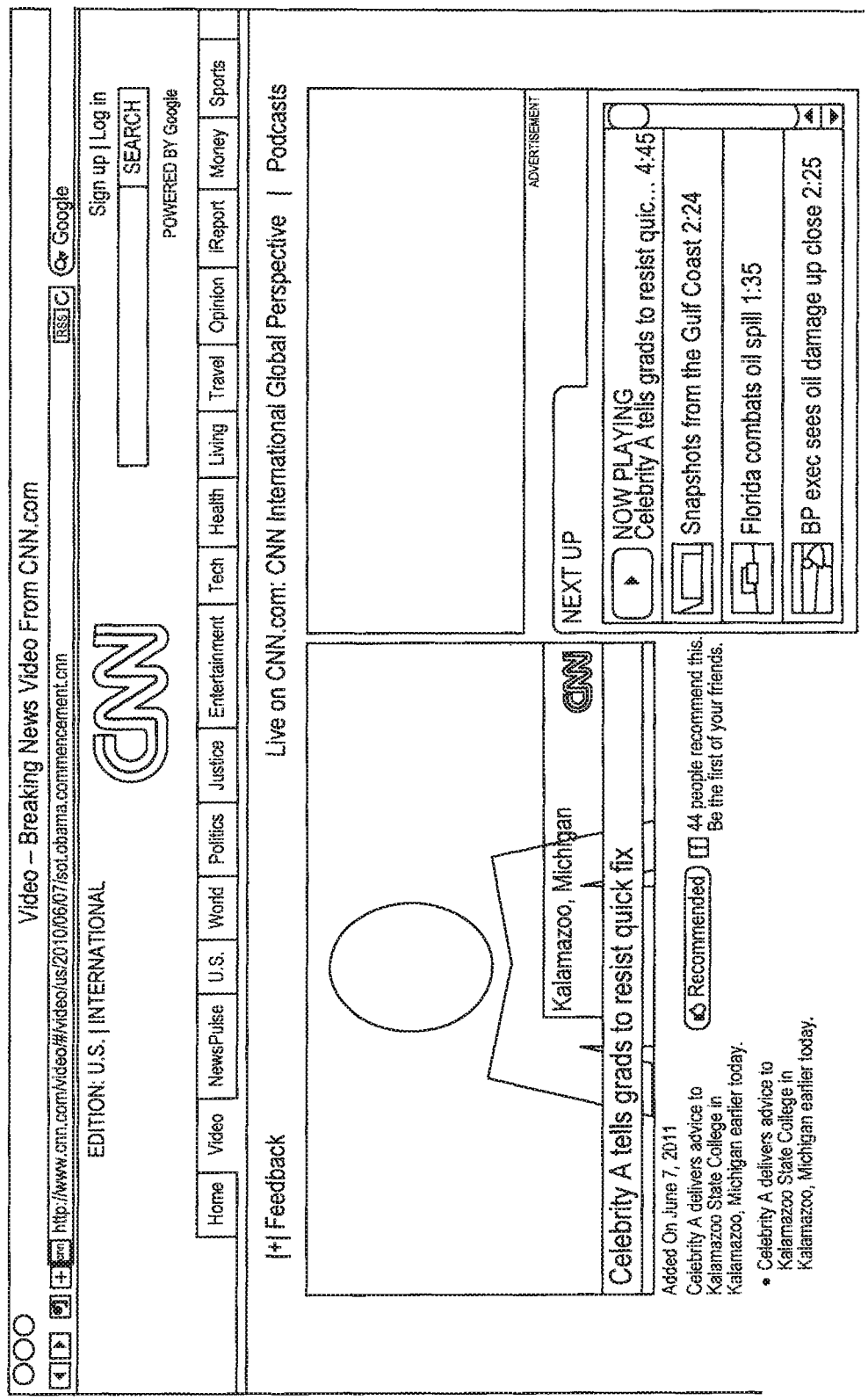
FIG. 11 is a screenshot of an exemplary web page on which a video may be available to users, consistent with embodiments of the present disclosure.

FIG. 11 is a screenshot of an exemplary web page on which a video may be available. In particular, once a user clicks on the primary video clip 1002 or one of the component video clips 1004, the user may be directed to the web site on which the complete video was originally posted, in this case "cnn.com." As a result, the operator of system 100 and methods 200, 300 may direct users to view the full video on web sites owned by entities that hold rights in the video content, while showing only fair use portions of videos through the video search module.

Figure 12A:
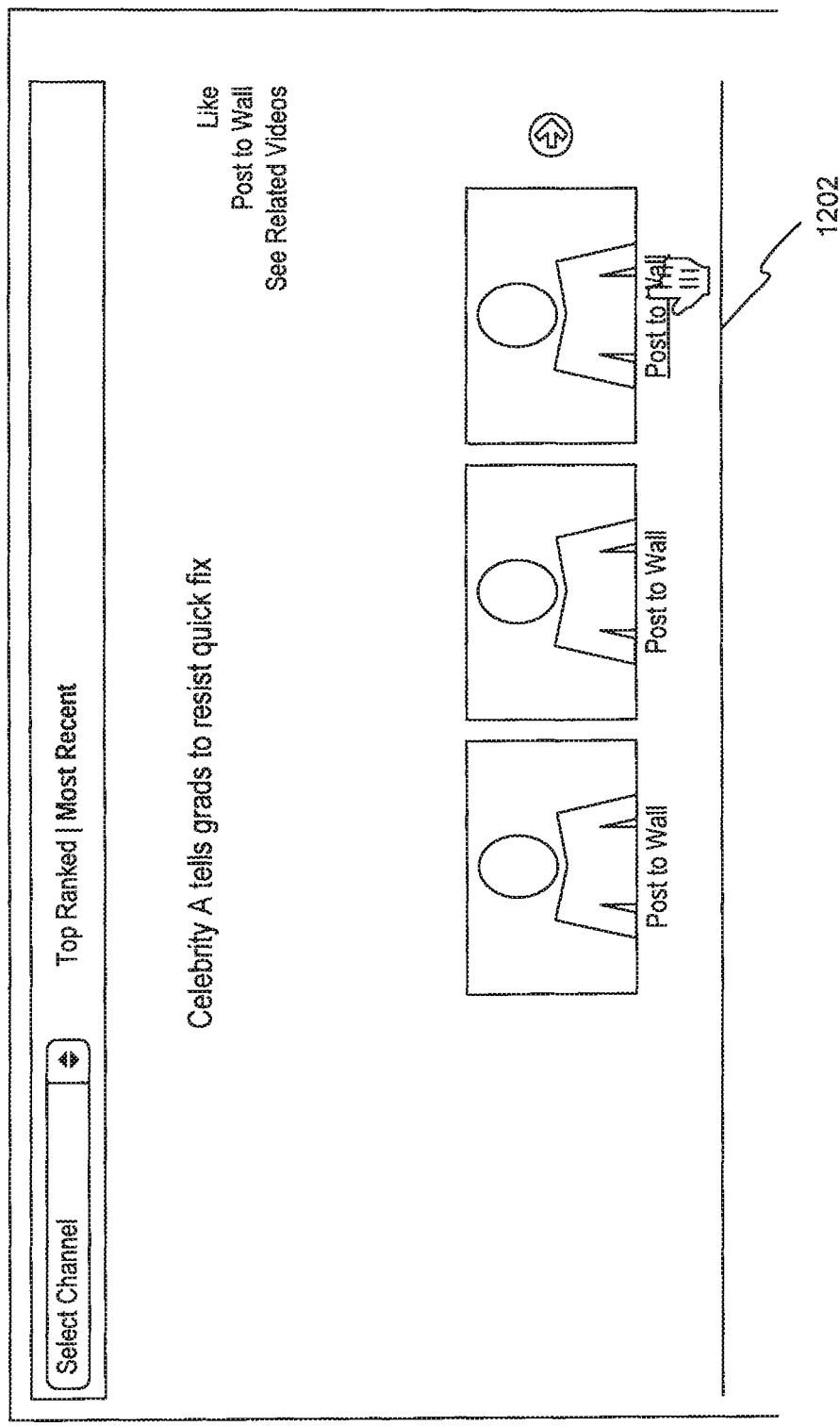
FIG. 12A is a screenshot of an exemplary video search result and user "wall post" element of a system for manipulating electronic media content over the Internet, consistent with embodiments of the present disclosure.
Figure 12B:
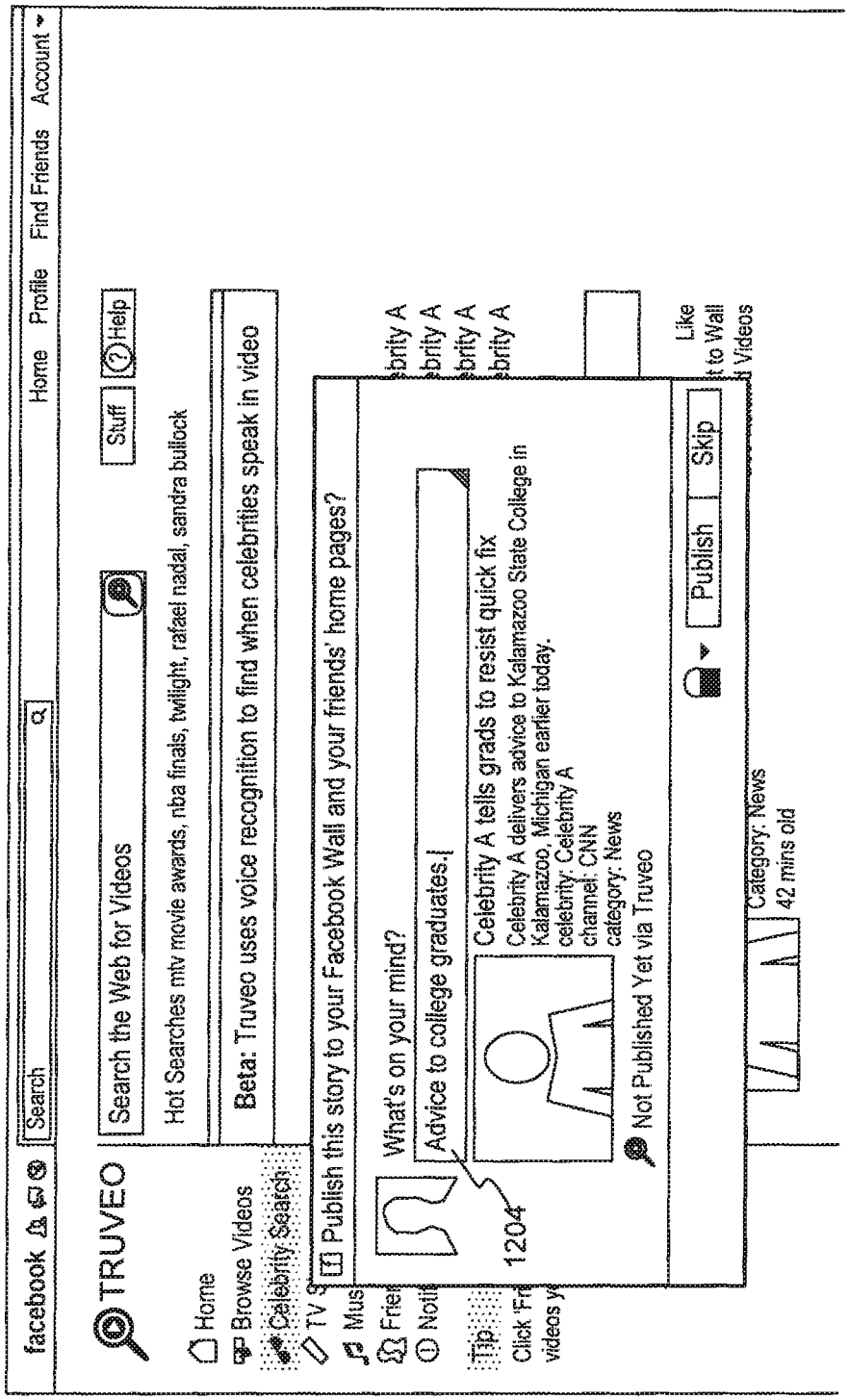
FIG. 12B is a screenshot of an exemplary user "wall post" and commentary window of a system for manipulating electronic media content over the Internet, consistent with embodiments of the present disclosure.

FIG. 12A is a screenshot of an exemplary video search results page and user "wall post" element 1202, by which a user may share a favorite part of a video with the user's social contacts. For example, when using a video searching module incorporated in a social-networking site, the user may click a link entitled, e.g., "Post to Wall" to share the video with the user's social-networking friends. FIG. 12B is a screenshot of an exemplary user "wall post" and commentary window 1204, by which a user may add textual commentary (e.g., "Advice to college graduates") to the posted video clip before it is posted to the user's social-networking wall. It will be appreciated that the user may incorporate any type or combination of commentary, including video commentary, video editing, etc.

Figure 13A:
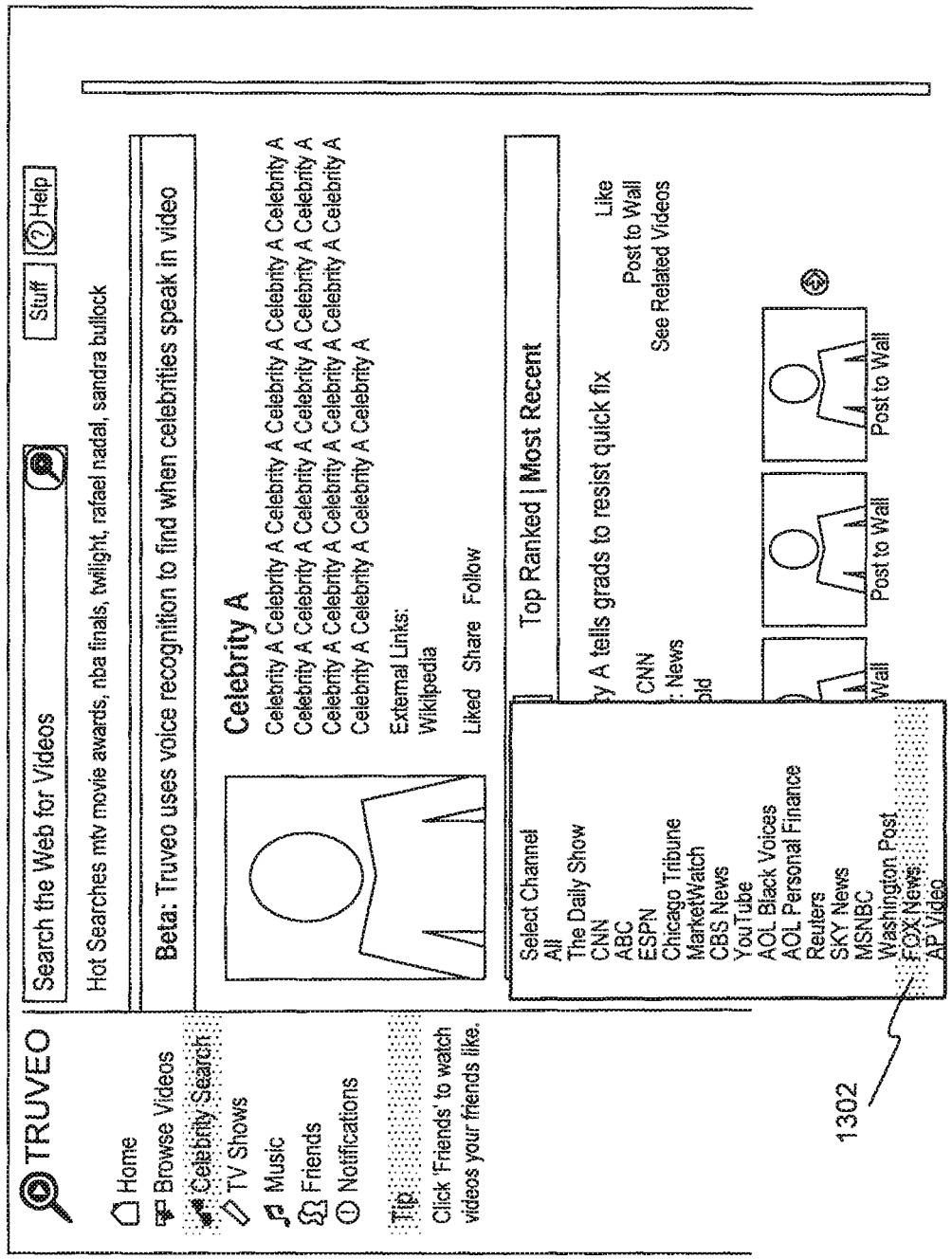
FIG. 13A is a screenshot of exemplary video search results and a filtering element of a system for manipulating electronic media content over the Internet, consistent with embodiments of the present disclosure.
Figure 13B:
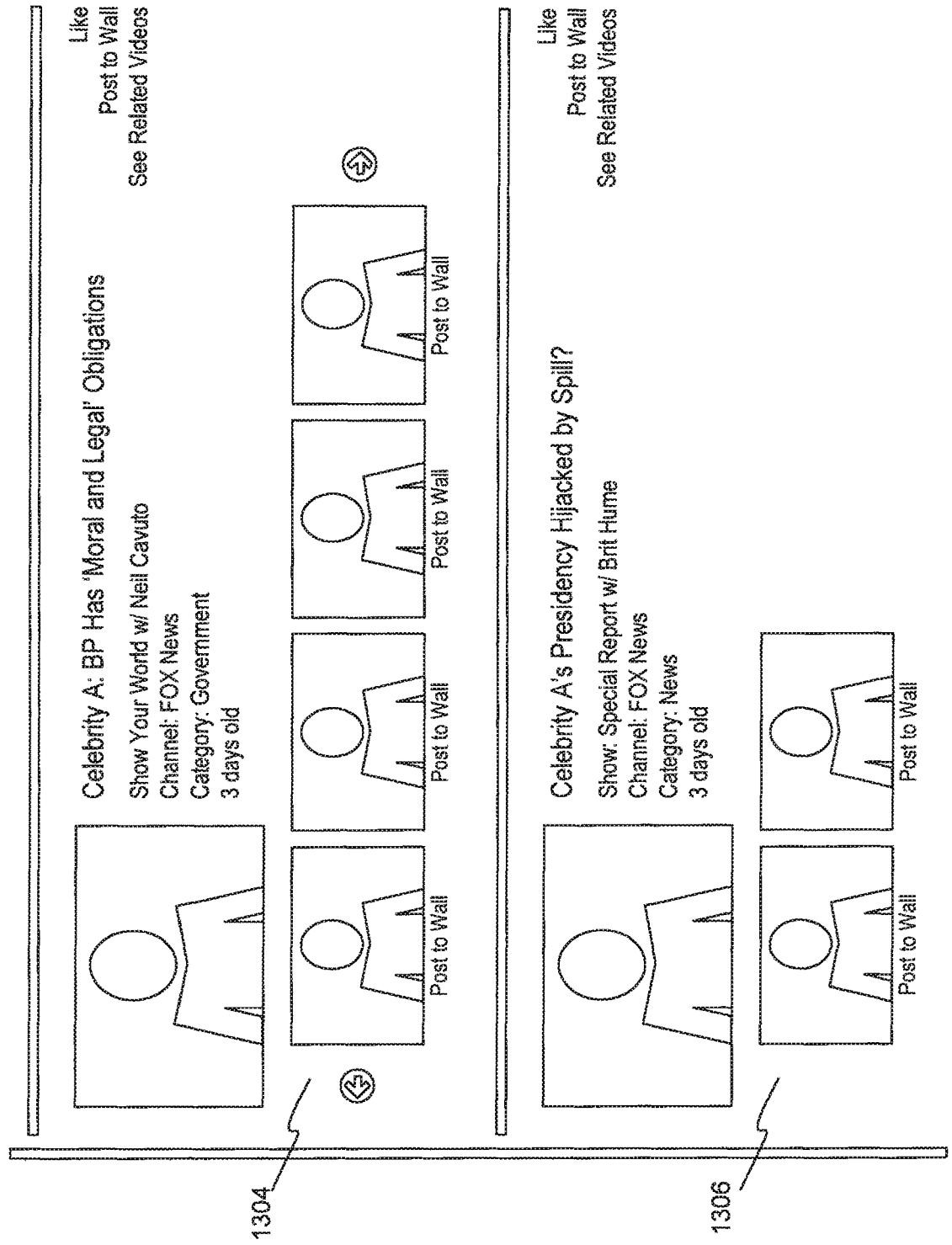
FIG. 13B is a screenshot of exemplary video search results of a system for manipulating electronic media content over the Internet, consistent with embodiments of the present disclosure.

FIG. 13A is a screenshot of exemplary video search results page and filtering element 1302, by which a user may select only videos corresponding to a particular source (e.g., a particular content provider 150, such as CNN.com or FoxNews.com). FIG. 13B is a screenshot of an exemplary video search results page, showing two different primary videos 1304 and 1306. In one embodiment, a user may determine how long a video is, or how long a speaker is speaking, by comparing the number of component clips associated with the primary video clip. As shown in FIG. 13B, primary video clip 1304 contains four component clips, while primary video clip 1306 contains two component clips. In this case, a user may infer that Barack Obama speaks for a longer period of time in primary video clip 804 than in primary video clip 1306.

Figure 14:
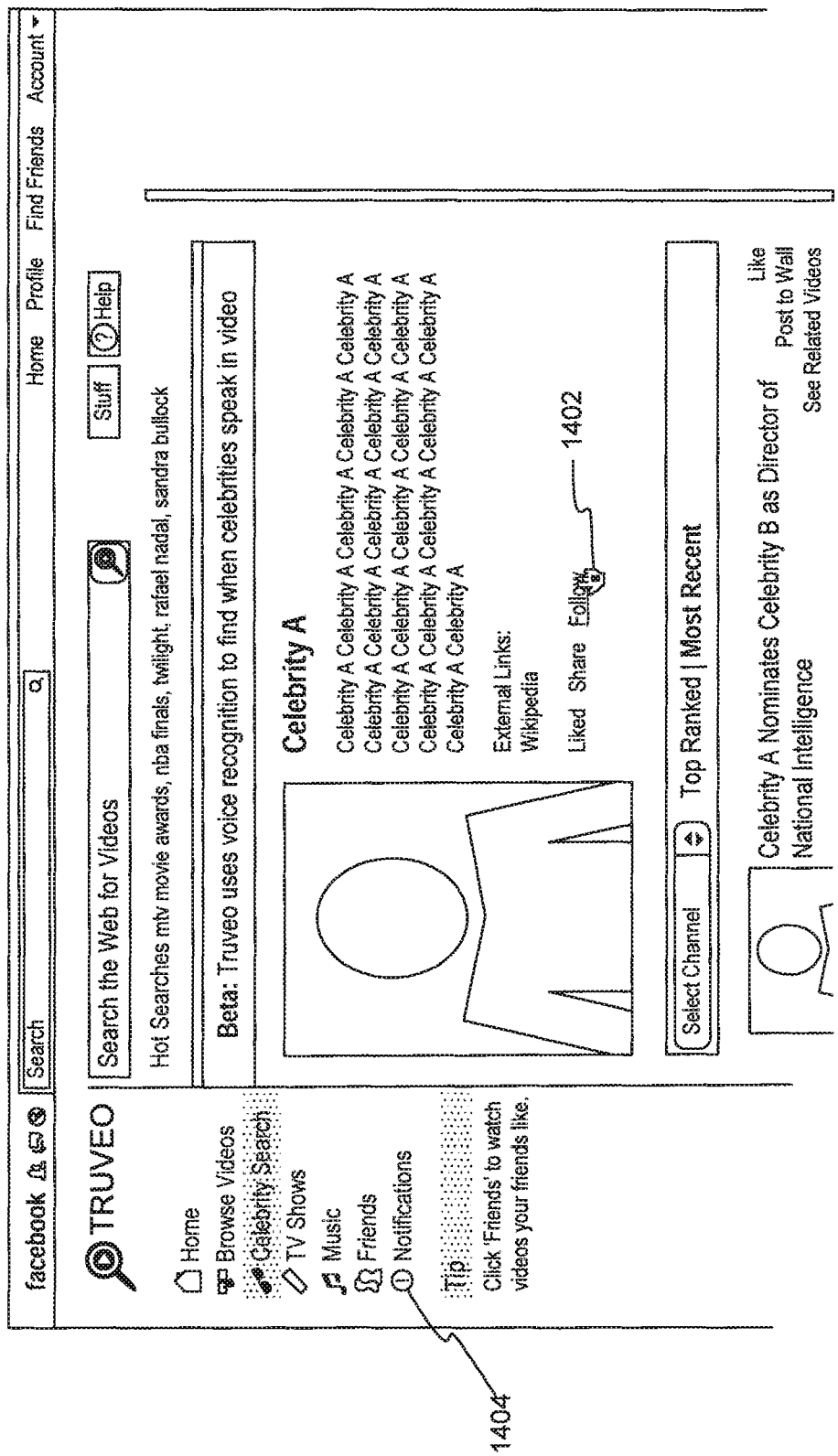
FIG. 14 is a screenshot of an exemplary video search results page, a speaker "following" element, and a notification element of a system for manipulating electronic media content over the Internet, consistent with embodiments of the present disclosure.

FIG. 14 is a screenshot of exemplary video search results, a speaker "following" element 1402, and a notification element 1404 associated with a main page of a particular speaker, in this case Barack Obama. In one embodiment, a user may click the "Follow" link 1402 to subscribe to a particular speaker or celebrity. Thereafter, the user will receive notifications 1404 any time the followed speaker performs certain actions on the Internet, or has video with speech uploaded to the Internet. For example, system 100 may continually or periodically analyze newly posted videos, identify any speakers associated with those videos, and then notify users who are interested in those particular speakers when such a video is available. In one embodiment, system 100 may send a link to the video to the user via e-mail or text message. Alternatively or additionally, system 100 may push an update notification to a user through a social networking website or other internet portal.

Figure 15:
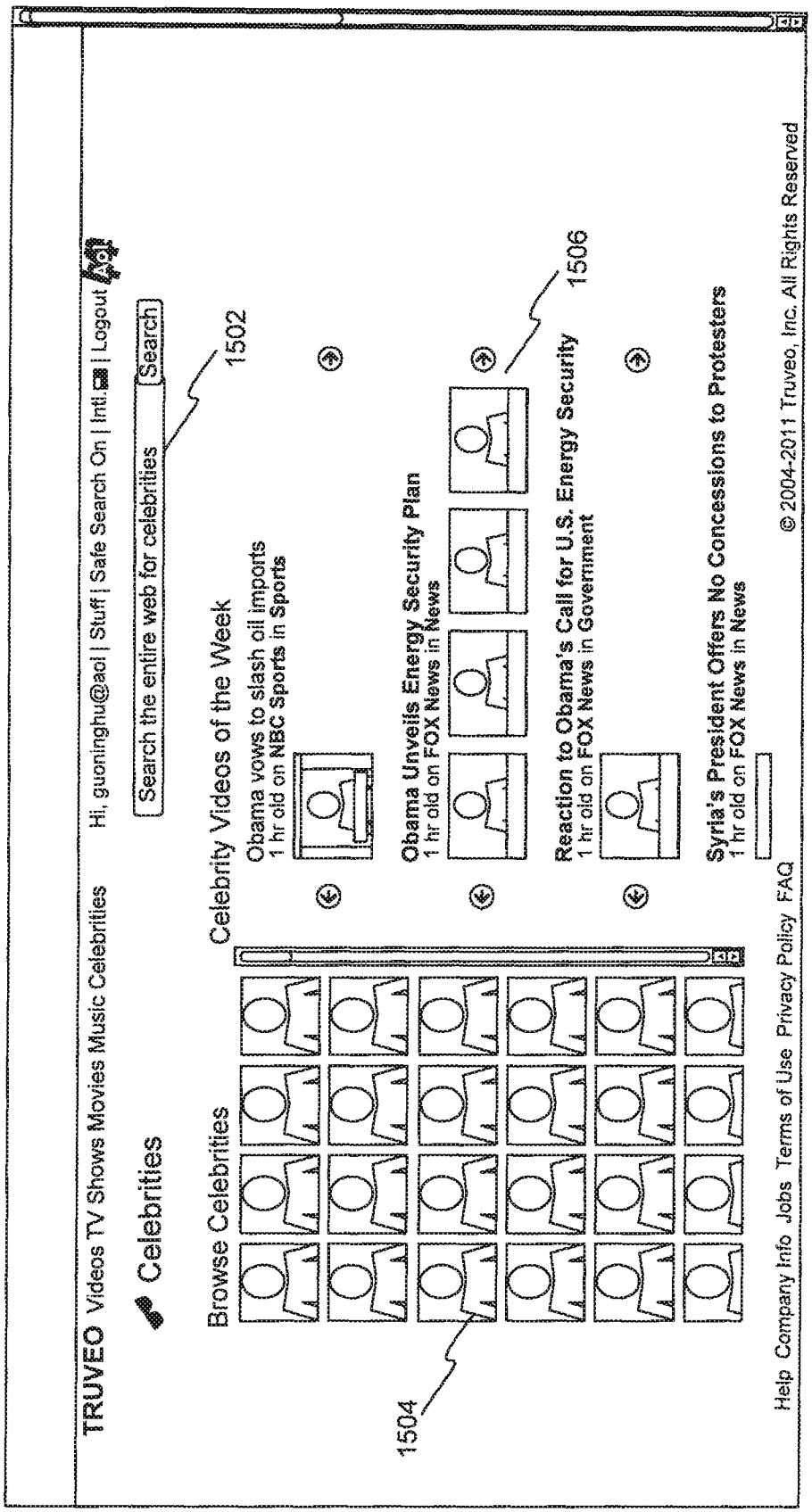
FIG. 15 is a screenshot of an exemplary search box and speaker grid of a system for manipulating electronic media content over the Internet, consistent with embodiments of the present disclosure.

FIG. 15 is a screenshot of an exemplary search box and speaker grid on a website of a system for manipulating electronic media content based on speaker recognition. In particular, FIG. 15 depicts a screenshot of an exemplary website of video search. The video search module may include a search box 1502, into which a user may type the names of celebrities/speakers he/she desires to view in a video. The video search module may also contain a celebrity/speaker grid 1504. Users may click on one of the celebrities/speakers in the grid 1504 to search for videos in which a selected speaker/celebrity spoke. The video search module may also contain a list of videos and associated preview clicks 1506. When a user "mouses over" the thumbnail, title, or previews of a video, the associated speaker may be highlighted in grid 1504. The preview video clips may contain 8-20 second components of the original video and a user may "mouse over" a clip to watch the short preview. In addition, once a user clicks on the primary video or one of the component video clips, the user may be directed to the website on which the complete video was originally posted and he/she can watch the entire video there. To determine proper videos and previews for display, the system may search intelligence database 108 for videos identified as having speech by certain speakers. Of course, intelligence database 108 may comprise tables, indices, etc. for searching by speakers, and may be combined with any desired type of access protection or back-up mechanisms. In one embodiment, the video search module and/or video search websites may be operated on web servers 104, while speech recognition and video analysis methods may be operated on back-end servers 106.

Figure 16:
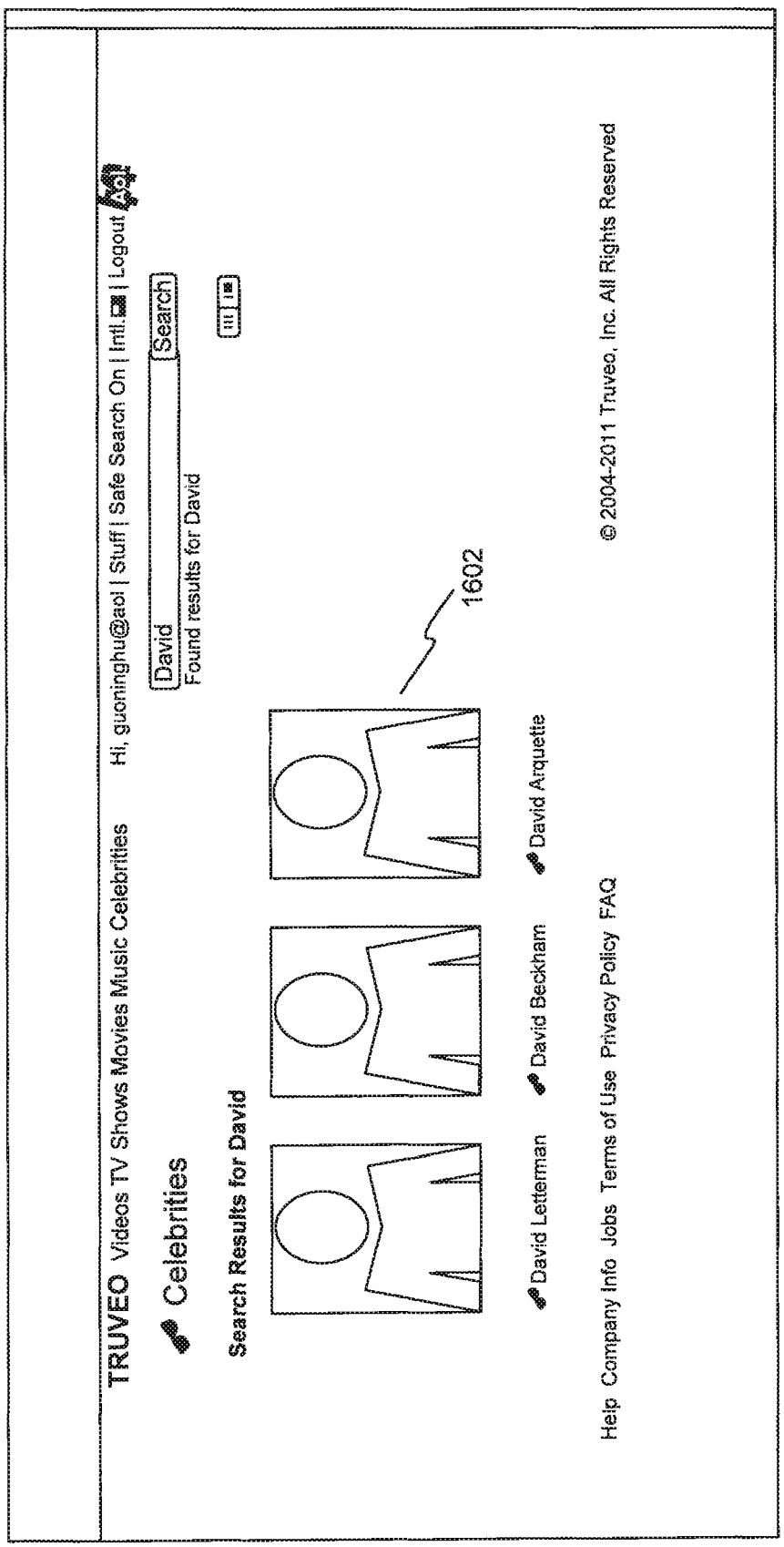
FIG. 16 is a screenshot of an exemplary search result of speakers of a system for manipulating electronic media content over the Internet, consistent with embodiments of the present disclosure.

FIG. 16 is a screenshot of an exemplary search results page of a grid 1602 of speakers/celebrities associated with results from a video search module consistent with the present disclosure. Users may click on one of the celebrities/speakers in grid 1602 to search for videos in which the selected speaker/celebrity spoke, in particular, assuming a user has typed "David" in the search box in FIG. 16 and hit the "Search" button or a "return" key, the search results page may display a list of celebrities whose name contains the word "David". To return such a list, an exemplary system may first collect metadata for each speaker and build a search index from the metadata. When a user sends a query, the exemplary systems disclosed herein may use the search index to find all associated speakers and return relevant results in grid 1602.

Figure 17A:
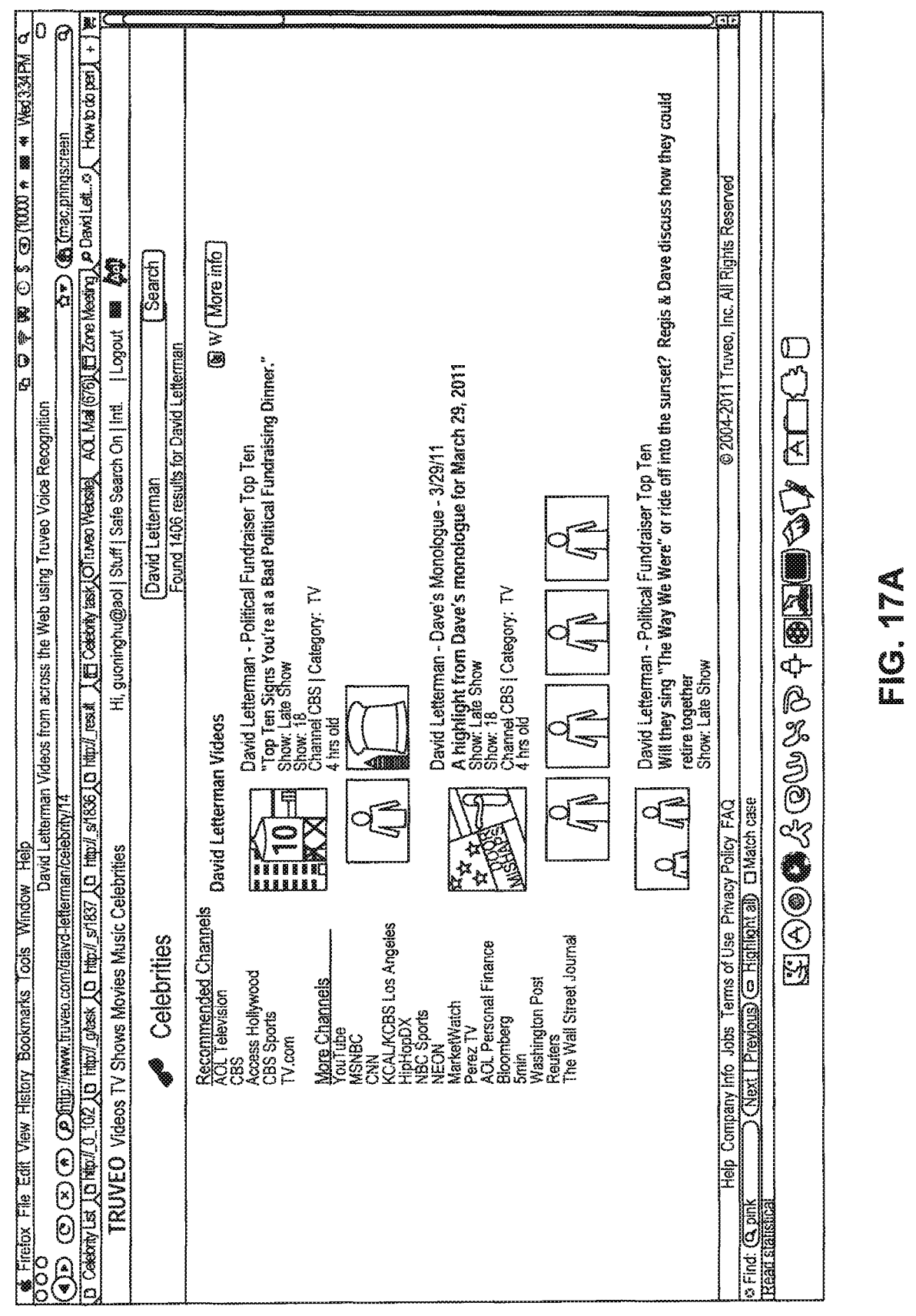

FIG. 17A is a screenshot of an exemplary search results page of speakers/celebrities associated with a video search module. In particular, assuming a user has clicked on the "David Letterman" icon in celebrity/speaker grid 1602 in FIG. 16 or the "David Letterman" icon in celebrity/speaker grid 1504 in FIG. 15, the search results page may display a list of primary videos in which David Letterman spoke and associated preview clips. Again, preview video clips may contain 8-20 second components of the original video and a user may "mouse over" a clip to watch the short preview. In addition, once a user clicks on the primary video or one of the component video clips, the user may be directed to the web site on which the complete video was originally posted. In one embodiment, primary video may be assembled from component video clips obtained from disparate sources, such as multiple content providers.

Figure 17B:
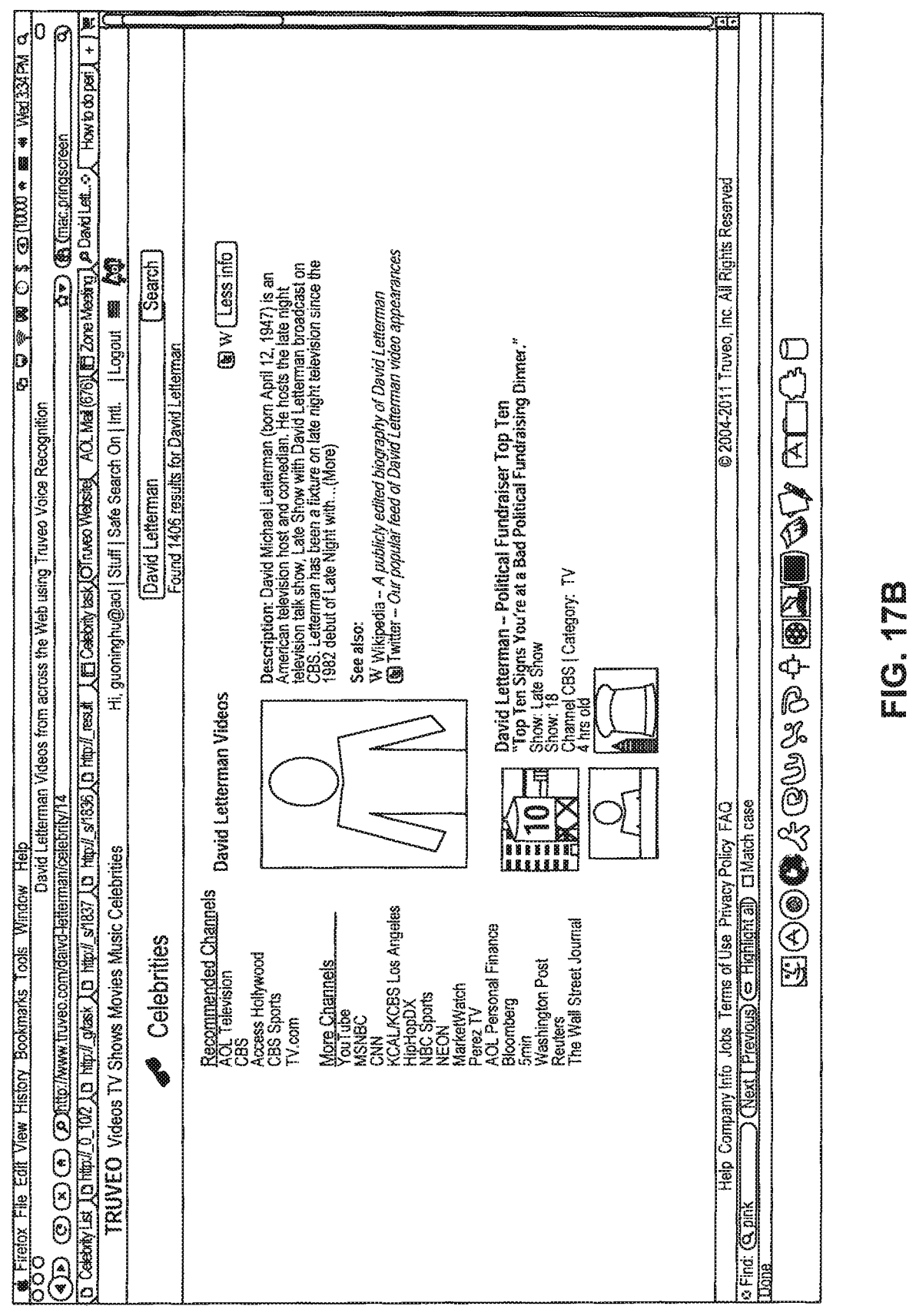

FIG. 17B is a screenshot of an exemplary search results page of speakers/celebrities associated with a video search module. Such an exemplary results page may contain the same videos and preview clips as shown in FIG. 17A, along with additional detailed information of the speaker. In one embodiment, a user may visit the results page of FIG. 17B by clicking the "More Info" button on the page shown in FIG. 17A and return to a general results page by clicking the "Less Info" button on the current page.

Figure 18:
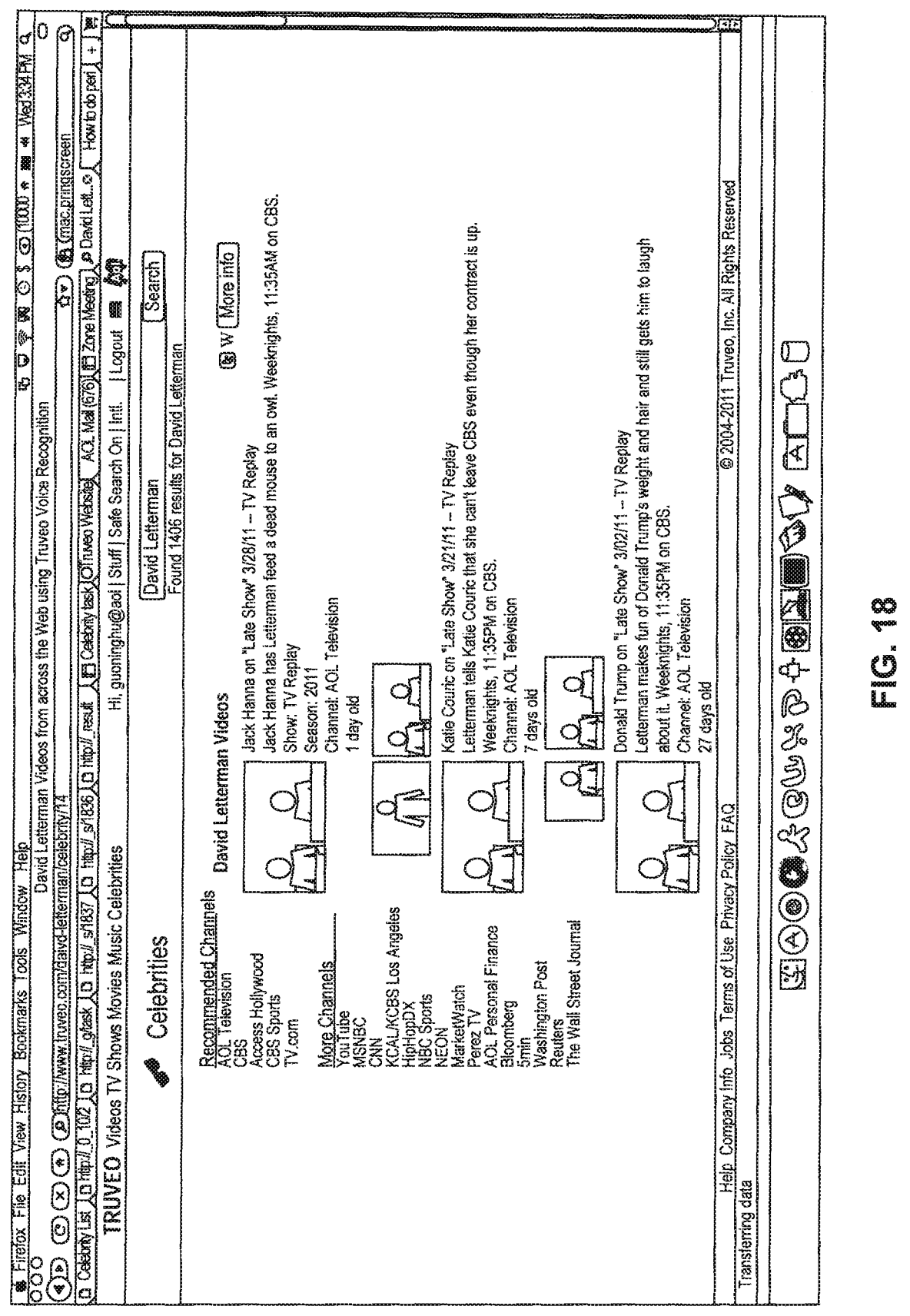

FIG. 18 is a screenshot of exemplary video search results page and filtering element, by which a user may select only videos corresponding to a particular source (e.g., a particular content provider 150, such as CNN.com or FoxNews.com), In particular, this page contains only videos from AOL Television among all the videos in which a speaker, e.g., David Letterman, spoke. A user may visit this page by clicking "AOL Television" within the channel list on the left of the page shown in FIG. 17A.

Figure 19:
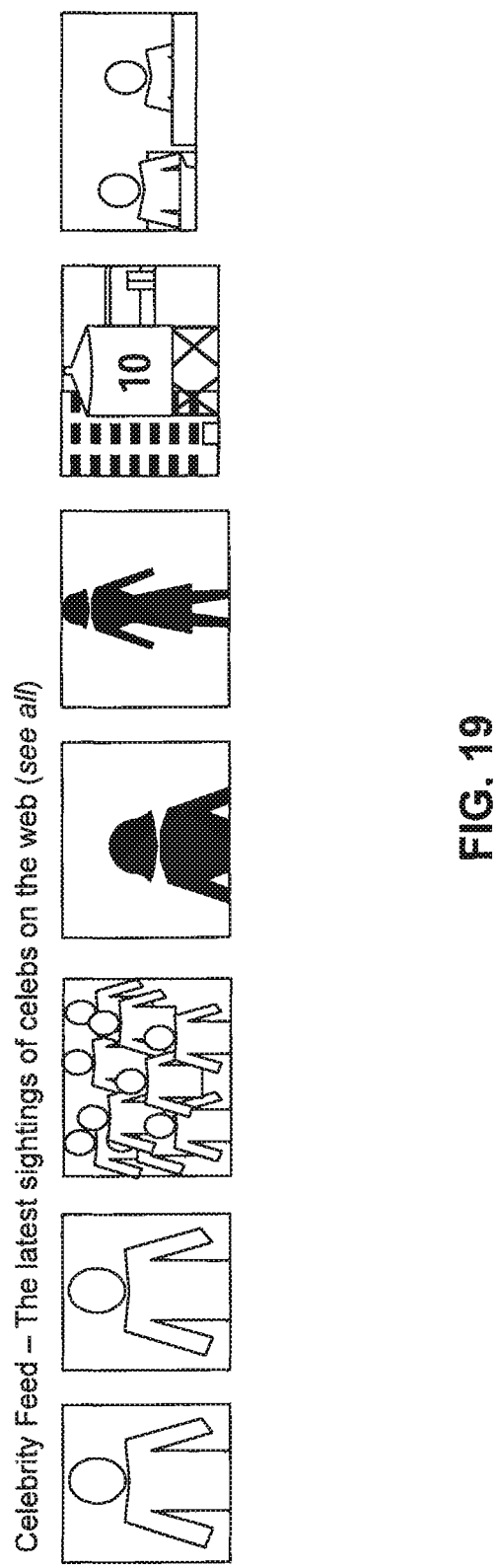
FIG. 19 is a screenshot of exemplary video search results of the most recent videos where certain speakers spoke, of a system for manipulating electronic media content over the Internet, consistent with embodiments of the present disclosure.

FIG. 19 is a screenshot of an exemplary video search results page including a list of most recent videos in which a group of selected speakers/celebrities spoke and provides a brief overview of current popular speakers/celebrities. By clicking one of the videos, a user may be directed to a page similar to that shown in FIG. 17A.

In view of the foregoing, it will be appreciated that, in order to build not only rich but also accurate associations among videos, it becomes advantageous to look into the video stream to discover its true content. This problem may be approached by first performing audio stream analysis to discover celebrity speakers and then finding videos that contain common portions of speech from a celebrity. This information may then be used to provide relevant and interesting videos. One advantage involves providing videos in which someone is commenting on celebrities speech. For example, when President Obama gives a new talk, the system may discover videos containing some portions of this talk, then detect whether someone else, such as another celebrity, is actually speaking, and select those videos that a user will most likely be interested in as related videos, in addition, a sequence of these related videos may be generated based on their content and data may be produced to form a video pool that presents the entire development of a host event to a user.

Another advantage of the present disclosure involves more scalable properties than other processes that examine video and audio streams for content. By way of example, building a system that recognizes any person's voice in any video on the Internet is currently computationally difficult. A machine would need to examine the content of M videos for N people, where both M and N are very large. Embodiments of this disclosure solve aspects of the scalability problem inherit in looking within a video stream by only looking for a smaller set of individuals (e.g., celebrities) In a smaller set of premium videos. The product is effective even without analyzing every video uploaded to a video sharing site (e.g. YouTube).

Another advantage of the present disclosure is the insight that there is often more interest in who is saying something than in what is being said. This is particularly relevant in the field of video search, where the current state of the art implementations transcribe what is spoken using speech-to-text technology. While useful, it is often the case that the key words that a user might search for are already in the description or title of the video and so speech-to-text is not helpful. For example, someone might search for "Obama healthcare", if there is a video of President Obama giving a healthcare speech, these words are often in the title or description of the video already. However, there are likely hundreds of videos in which many people use the word "healthcare" and "Obama", even though such videos do not actually contain President Obama speaking. To overcome these obstacles in search, the presently disclosed embodiments identify the individual (Obama in this case), in order to deliver the appropriate result to the user.

Another advantage of the present disclosure is the development of a new search query modifier ("person:"). Web search engines and video search engines often use modifiers that allow the consumer to filter the result set. For example, "site:" is a common modifier is used to filter the results ("Obama site:nytimes.com"). In video search, there are often multiple modifiers including: channel:, category:, tag:, type:, duration: etc. Embodiments of the present disclosure add a new modifier "person:" to limit the results to a particular person based on their speech, which no one has used to date.

Embodiments of the present disclosure may include a method or process, an apparatus or system, or computer software on a computer medium, it is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

It will be apparent to those skilled in the art that various modifications and variations can be made to the systems and methods disclosed herein. It is intended that the disclosed embodiments and examples be considered as exemplary only, with a true scope of the present disclosure being indicated by the following claims and their equivalents.

The invention claimed is:

1. A computer-implemented method for manipulating electronic multimedia content, the method comprising:
    generating, using a processor, a speech model and at least one speaker model of an individual speaker;
    receiving electronic media content over a network;
    extracting an audio track from the electronic media content;
    utilizing the speech model and the at least one speaker model to identify speakers in the audio track by:
        detecting a plurality of speech segments within the electronic media content based on the speech model; and
        identifying at least one speaker associated with at least one of the speech segments by determining a probability that the at least one of the speech segments contains the individual speaker based on the at least one speaker model;
    determining a ranking of the electronic media content relative to other electronic media content based on (i) the determined probability that at least one of the speech segments contains a voice of the individual speaker, (ii) probabilities for speech segments containing the voice of the individual speaker within the other electronic media content, (iii) text relevancy between a user query and metadata of the individual speaker, and (iv) a normalized duration of speech segments from the individual speaker; and
    generating a fingerprint of the electronic media content based on the ranking of the electronic media content.

2. The computer-implemented method of claim 1, further comprising:
    determining probabilities that each of the plurality of the speech segments contains the voice of the individual speaker; and
    determining a ranking or filtration of each of the plurality of speech segments or electronic media content based on the determined probabilities that each of the plurality of speech segments contains the voice of the individual speaker.

3. The computer-implemented method of claim 2, wherein determining the ranking or filtration comprises:
    analyzing the user query to generate a list of associated speakers; and
    adjusting the ranking or filtration based on detected speech segments from speakers in the list of associated speakers.

4. The computer-implemented method of claim 2, wherein determining probabilities comprises:
    selecting electronic media content containing speech from speakers in a list of associated speakers.

5. The computer-implemented method of claim 1, further comprising:
    generating a plurality of speaker models for a subset of people, each speaker model corresponding to one person in the subset of people; and
    determining probabilities that at least one of the plurality of speech segments contains a voice of one of the people in the subset of people, based on the plurality of speaker models.

6. The computer-implemented method of claim 1, further comprising:
    determining probabilities that each of the plurality of speech segments contains a voice of any of a plurality of speakers by comparing the plurality of speech segments with a plurality of speaker models; and
    determining duplicated media in the electronic media content based on the probabilities that each of the plurality of speech segments contains the voice of any of the plurality of speakers.

7. The computer-implemented method of claim 6, further comprising:
    detecting words in the plurality of speech segments; and
    displaying the electronic media content to users based on the probabilities that each of the plurality of speech segments contains the voice of any of the plurality of speakers and the detected words.

8. The computer-implemented method of claim 1, further comprising:
    based on the probability that the at least one of the speech segments contains the voice of the individual speaker, extracting at least one preview clip from the electronic media content, the preview clip being associated with the individual speaker; and
    displaying the at least one preview clip to a user associated with the user query.

9. A system for manipulating electronic multimedia content, the system comprising:
    at least one data storage device storing instructions for manipulating electronic multimedia content; and
    at least one processor configured to execute the instructions stored in the data storage device to perform operations comprising:
        generating, using the at least one processor, a speech model and at least one speaker model of an individual speaker;
        receiving electronic media content over a network;
        extracting an audio track from the electronic media content;

utilizing the speech model and the at least one speaker model to identify speakers in the audio track by:
  detecting a plurality of speech segments within the electronic media content based on the speech model; and
  identifying at least one speaker associated with at least one of the speech segments by determining a probability that the at least one of the speech segments contains the individual speaker based on the at least one speaker model;
determining a ranking of the electronic media content relative to other electronic media content based on (i) the determined probability that at least one of the speech segments contains a voice of the individual speaker, (ii) probabilities for speech segments containing the voice of the individual speaker within the other electronic media content, (iii) text relevancy between a user query and metadata of the individual speaker, and (iv) a normalized duration of speech segments from the individual speaker; and
generating a fingerprint of the electronic media content based on the ranking of the electronic media content.

10. The system of claim 9, the operations further comprising:
  determining probabilities that each of the plurality of the speech segments contains the voice of the individual speaker; and
  determining a ranking or filtration of each of the plurality of speech segments or electronic media content based on the determined probabilities that each of the plurality of speech segments contains the voice of the individual speaker.

11. The system of claim 10, wherein determining the ranking or filtration comprises:
  analyzing the user query to generate a list of associated speakers; and
  adjusting the ranking or filtration based on detected speech segments from speakers in the list of associated speakers.

12. The system of claim 10, wherein determining probabilities comprises:
  selecting electronic media content containing speech from speakers in a list of associated speakers.

13. The system of claim 9, the operations further comprising:
  generating a plurality of speaker models for a subset of people, each speaker model corresponding to one person in the subset of people; and
  determining probabilities that at least one of the plurality of speech segments contains a voice of one of the people in the subset of people, based on the plurality of speaker models.

14. The system of claim 9, the operations further comprising:
  determining probabilities that each of the plurality of speech segments contains a voice of any of a plurality of speakers by comparing the plurality of speech segments with a plurality of speaker models; and
  determining duplicated media in the electronic media content based on the probabilities that each of the plurality of speech segments contains the voice of any of the plurality of speakers.

15. The system of claim 14, the operations further comprising:
  detecting words in the plurality of speech segments; and
  displaying the electronic media content to users based on the probabilities that each of the plurality of speech segments contains the voice of any of the plurality of speakers and the detected words.

16. The system of claim 9, the operations further comprising:
  based on the probability that the at least one of the speech segments contains the voice of the individual speaker, extracting at least one preview clip from the electronic media content, the preview clip being associated with the individual speaker; and
  displaying the at least one preview clip to a user associated with the user query.

17. A non-transitory computer-readable medium for manipulating electronic multimedia content, storing instructions to execute operations comprising:
  generating, using a processor, a speech model and at least one speaker model of an individual speaker;
  receiving electronic media content over a network;
  extracting an audio track from the electronic media content;
  utilizing the speech model and the at least one speaker model to identify speakers in the audio track by:
    detecting a plurality of speech segments within the electronic media content based on the speech model; and
    identifying at least one speaker associated with at least one of the speech segments by determining a probability that the at least one of the speech segments contains the individual speaker based on the at least one speaker model;
  determining a ranking of the electronic media content relative to other electronic media content based on (i) the determined probability that at least one of the speech segments contains a voice of the individual speaker, (ii) probabilities for speech segments containing the voice of the individual speaker within the other electronic media content, (iii) text relevancy between a user query and metadata of the individual speaker, and (iv) a normalized duration of speech segments from the individual speaker; and
  generating a fingerprint of the electronic media content based on the ranking of the electronic media content.

18. The computer-readable medium of claim 17, the operations further comprising:
  determining probabilities that each of the plurality of the speech segments contains the voice of the individual speaker; and
  determining a ranking or filtration of each of the plurality of speech segments or electronic media content based on the determined probabilities that each of the plurality of speech segments contains the voice of the individual speaker.

19. The computer-readable medium of claim 18, wherein determining the ranking or filtration comprises:
  analyzing the user query to generate a list of associated speakers; and
  adjusting the ranking or filtration based on detected speech segments from speakers in the list of associated speakers.

20. The computer-readable medium of claim 18, wherein determining probabilities comprises:
  selecting electronic media content containing speech from speakers in a list of associated speakers.

* * * * *